US00RE46074E

(19) United States
(12) Reissued Patent
Cuniberti et al.

(10) Patent Number: US RE46,074 E
(45) Date of Reissued Patent: Jul. 19, 2016

(54) SUPERCHARGED INTERNAL COMBUSTION ENGINE

(71) Applicant: C.R.F. Societa Consortile per Azioni, Orbassano (Torino) (IT)

(72) Inventors: Marco Cuniberti, Orbassano (IT); Roberto Saretto, Orbassano (IT); Damiano Micelli, Orbassano (IT)

(73) Assignee: C.R.F. SOCIETA CONSORTILE PER AZIONI, Orbassano (Torino) (IT)

(21) Appl. No.: 14/249,009

(22) Filed: Jun. 17, 2014

Related U.S. Patent Documents

Reissue of:
(64) Patent No.: 8,572,963
Issued: Nov. 5, 2013
Appl. No.: 13/153,935
Filed: Jun. 6, 2011

(30) Foreign Application Priority Data

Jun. 11, 2010 (IT) ..... TO2010A0496

(51) Int. Cl.
*F02B 33/44* (2006.01)
*B60K 6/20* (2007.10)
(Continued)

(52) U.S. Cl.
CPC ..... *F01D 25/125* (2013.01); *F01D 25/14* (2013.01); *F01D 25/162* (2013.01); *F01D 25/18* (2013.01);
(Continued)

(58) Field of Classification Search
CPC ... F01D 25/125; F01D 25/162; F01D 25/265; F01D 25/14; F01D 25/18; F02B 37/00; F02B 67/10; F02C 6/12; F05D 2230/53; F01N 13/10; F02F 1/243; Y02T 10/144
USPC ..... 60/605.3, 605.1, 597; 123/559.1, 559.2
See application file for complete search history.

(56) References Cited

U.S. PATENT DOCUMENTS 1,903,210 A * 3/1933 Carrier ..... 277/388
3,948,052 A 4/1976 Merkle et al.
(Continued)

FOREIGN PATENT DOCUMENTS

DE 3133953 A1 5/1982
JP 57052624 3/1982
(Continued)

OTHER PUBLICATIONS

Machine translation of JP2006-063851 (Uchiumi).*
(Continued)

*Primary Examiner* — William Doerrler
(74) *Attorney, Agent, or Firm* — Heslin Rothenberg Farley & Mesiti, P.C.; Victor A. Cardona, Esq.

(57) ABSTRACT

A supercharged internal combustion engine includes a motor unit having a head and an exhaust manifold. A turbocharger assembly is fluid dynamically connected to the exhaust manifold, wherein the turbocharger assembly includes a turbine, a central body and a compressor. The turbocharger assembly includes a lubrication channel for the passage of a lubricating fluid hydraulically connected to a lubrication circuit of the motor unit of said internal combustion engine. The turbine includes a jacket, provided at least in part in a body thereof, arranged for the passage of a cooling fluid and in hydraulic communication with an inlet channel and an outlet channel hydraulically connected to a cooling circuit of the motor unit of said internal combustion engine. The inlet channel, outlet channel and lubrication channel are integrated in said turbocharger assembly in correspondence of a connection interface between said turbocharger assembly and the motor unit.

13 Claims, 21 Drawing Sheets

(51) Int. Cl.

| | |
|---|---|
| ***F02B 33/00*** | (2006.01) |
| ***F01D 25/12*** | (2006.01) |
| ***F01D 25/16*** | (2006.01) |
| ***F01D 25/18*** | (2006.01) |
| ***F01D 25/14*** | (2006.01) |
| ***F01D 25/26*** | (2006.01) |
| ***F01N 13/10*** | (2010.01) |
| ***F02B 67/10*** | (2006.01) |
| ***F02B 37/00*** | (2006.01) |
| ***F02C 6/12*** | (2006.01) |
| ***F02F 1/24*** | (2006.01) |

(52) U.S. Cl.

CPC ..... *F01D 25/265* (2013.01); *F01N 13/10* (2013.01); *F02B 37/00* (2013.01); *F02B 67/10* (2013.01); *F02C 6/12* (2013.01); *F02F 1/243* (2013.01); *F05D 2230/53* (2013.01); *Y02T 10/144* (2013.01)

(56) References Cited

U.S. PATENT DOCUMENTS

| | | | | |
|---|---|---|---|---|
| 4,068,612 | A * | 1/1978 | Meiners | 440/89 R |
| 4,616,482 | A * | 10/1986 | Kronogard et al. | 60/624 |
| 4,716,735 | A * | 1/1988 | Ruf et al. | 60/605.3 |
| 6,568,376 | B2 * | 5/2003 | Sonnleitner et al. | 123/559.1 |
| 7,089,737 | B2 * | 8/2006 | Claus | 60/605.1 |
| 7,946,118 | B2 * | 5/2011 | Hippen et al. | 60/605.3 |
| 8,256,402 | B2 * | 9/2012 | Yamagata et al. | 123/559.1 |
| 8,572,963 | B2 | 11/2013 | Cuniberti et al. | |
| 2007/0036664 | A1 * | 2/2007 | Shibui et al. | 417/407 |
| 2008/0087018 | A1 * | 4/2008 | Woollenweber | 60/605.3 |
| 2009/0151327 | A1 * | 6/2009 | Zimmermann | 60/280 |

FOREIGN PATENT DOCUMENTS

| | | | | |
|---|---|---|---|---|
| JP | 2002303145 | | 10/2002 | |
| JP | 2002364375 | A * | 12/2002 | F02B 39/00 |
| JP | 2006063851 | | 3/2006 | |
| JP | 2006063851 | A * | 3/2006 | |
| JP | 2006194227 | | 7/2006 | |
| JP | 2006249945 | | 9/2006 | |
| JP | 20100381091 | A * | 2/2010 | F02B 39/00 |
| WO | WO 2011/091129 | A2 | 7/2011 | |

OTHER PUBLICATIONS

Espacenet Machine Translation (English) of JP2006063851 A.*

Japanese Patent Publication 2010-038091 to Sadamitsu, English translation by AIPN machine translation.*

WO 00/68552 to Lindbrandt et al, English translatin by Espacenet machine translation.*

Japanese Patent Publication 2002-364375 to Katayama, English translation by AIPN machine translation.*

Italian Search report, dated Jan. 25, 2011, for corresponding Italian priority application No. TO20100498 filed Jun. 11, 2010.

European Office Action issued on Sep. 13, 2012, for corresponding EP Application No. 10425205.1.

* cited by examiner

SUPERCHARGED INTERNAL COMBUSTION ENGINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This *application is a reissue of U.S. Pat. No. 8,572,963 issued on Nov. 5, 2013* (*U.S. Ser. No. 13/153,935, filed Jun. 6, 2011*), *which* application claims priority from Italian patent application No. TO2010A000498, filed on Jun. 11, 2010, the entire disclosure of which is incorporated herein by reference.

FIELD OF THE INVENTION

The present invention refers to a supercharged internal combustion engine comprising:

a motor unit including a head and an exhaust manifold, a turbocharger assembly fluid dynamically connected to said exhaust manifold, wherein said turbocharger assembly includes a turbine, a central body and a compressor.

DESCRIPTION OF THE PRIOR ART AND GENERAL TECHNICAL PROBLEM

Supercharging internal combustion engines by means of turbocharger today plays a key role in the automotive industry due to the demand, by the market, for vehicles with lower environmental impact, low fuel consumption and at the same time offering good performance. In particular, currently the most common design trend among automotive producers is that of "downsizing", i.e. the reduction of the engine displacement, hence requiring, in order to guarantee good performance for vehicles on which the engines are installed, supercharging the same engines.

However, supercharging by means of turbocharger entails several well known drawbacks. Apart from, for example, the well known problems related to knock control typical of spark ignition engines, the problems regarding the hydraulic connection between the turbocharger and the internal combustion engine for the circulation of oil and possibly cooling water within the central body of the turbocharger itself are of considerable importance.

In fact, the internal combustion engines of the known type generally comprise one or more pipings having an end connected hydraulically and mechanically to the engine itself, for example to a cooling circuit or to a lubrication circuit, and a second end connected hydraulically and mechanically to inlet/outlet ports located on the central body of the turbocharger. The cost of such connections is quite high because each connection between an internal combustion engine and turbocharger implies the use of fittings, gaskets and fastening elements.

Nevertheless, on spark ignition engines, the turbine body is made of high resistance steel with high contents of nickel (for example Nimonic® steel). Such steel is very expensive and the higher the nickel content the more expensive the steel. The higher the temperature of the exhaust gases flowing into the turbine, the higher the nickel amount required in such steels.

Furthermore, there arises a related drawback typical of turbocharged engines: the body of the turbine, not cooled, reaches extremely high working temperatures, hence, combined with the considerable overall dimensions of the turbocharger assembly, it makes the installation of the latter complex, because it is necessary to envisage the use of protection panels for protecting the surrounding components from contact with the body of the turbine or from overexposure to a heat flow coming therefrom.

Lastly, if on one hand there are drawbacks related to the high cost of some materials, to the working temperatures and upon installation of the turbocharger assembly, on the other hand there are problems regarding the high number of components required for the coupling of a turbocharger assembly to an internal combustion engine, as well as the high number of components that form the turbocharger assembly itself.

OBJECT OF THE INVENTION

The object of the present invention is that of overcoming the previously described drawbacks. In particular, the object of the invention is that of reducing the cost and the number of components required for producing and for coupling a turbocharger to the motor unit of an internal combustion engine, as well as that of optimising the operation of the turbo assembly in transient conditions of the engine following a cold start.

SUMMARY OF THE INVENTION

The object of the present invention is attained by a turbocharged internal combustion engine having the features forming the subject of the claims that follow, which form an integral part of the technical disclosure provided herein in relation to the invention.

In particular, the object of the present invention is attained by an internal combustion engine having all the characteristics listed at the beginning of the present description and further characterised in that:

said turbocharger assembly comprises a lubrication channel for the passage of a lubricating fluid hydraulically connected to a lubrication circuit of said motor unit of said internal combustion engine, said turbine comprises a jacket provided at least in part in a body thereof, arranged for the passage of a cooling fluid and in hydraulic communication with an inlet channel and an outlet channel hydraulically connected to a cooling circuit of said motor unit of said internal combustion engine, said inlet channel, outlet channel and lubrication channel being integrated in said turbocharger assembly in correspondence of a connection interface between said turbocharger assembly and said motor unit of said internal combustion engine.

BRIEF DESCRIPTION OF THE DRAWINGS

The invention will now be described with reference to the attached drawings, wherein.

DETAILED DESCRIPTION OF THE INVENTION

Figure 1:
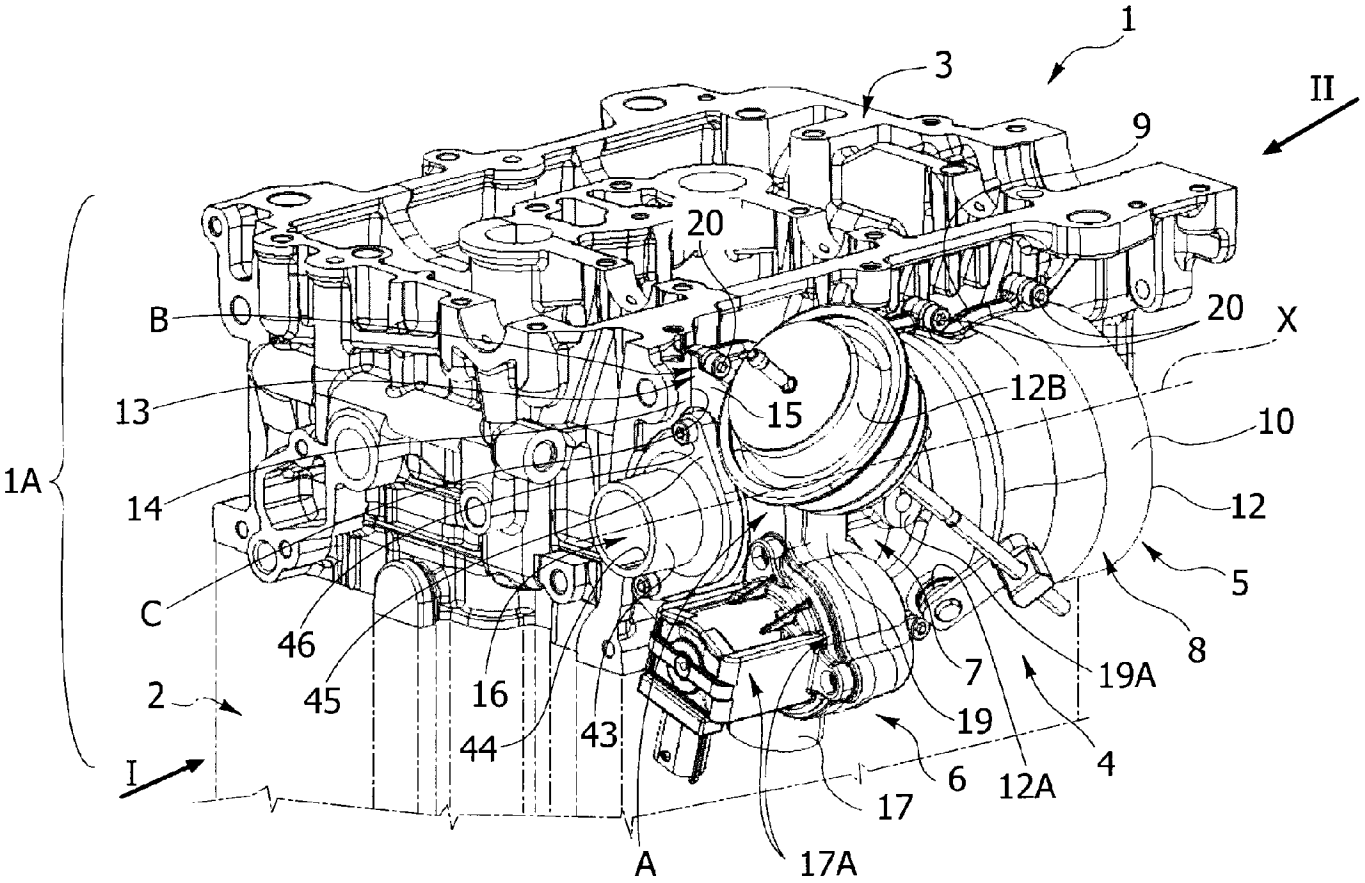
FIG. 1 is a perspective view of an internal combustion engine according to the present invention.
Figure 1A:
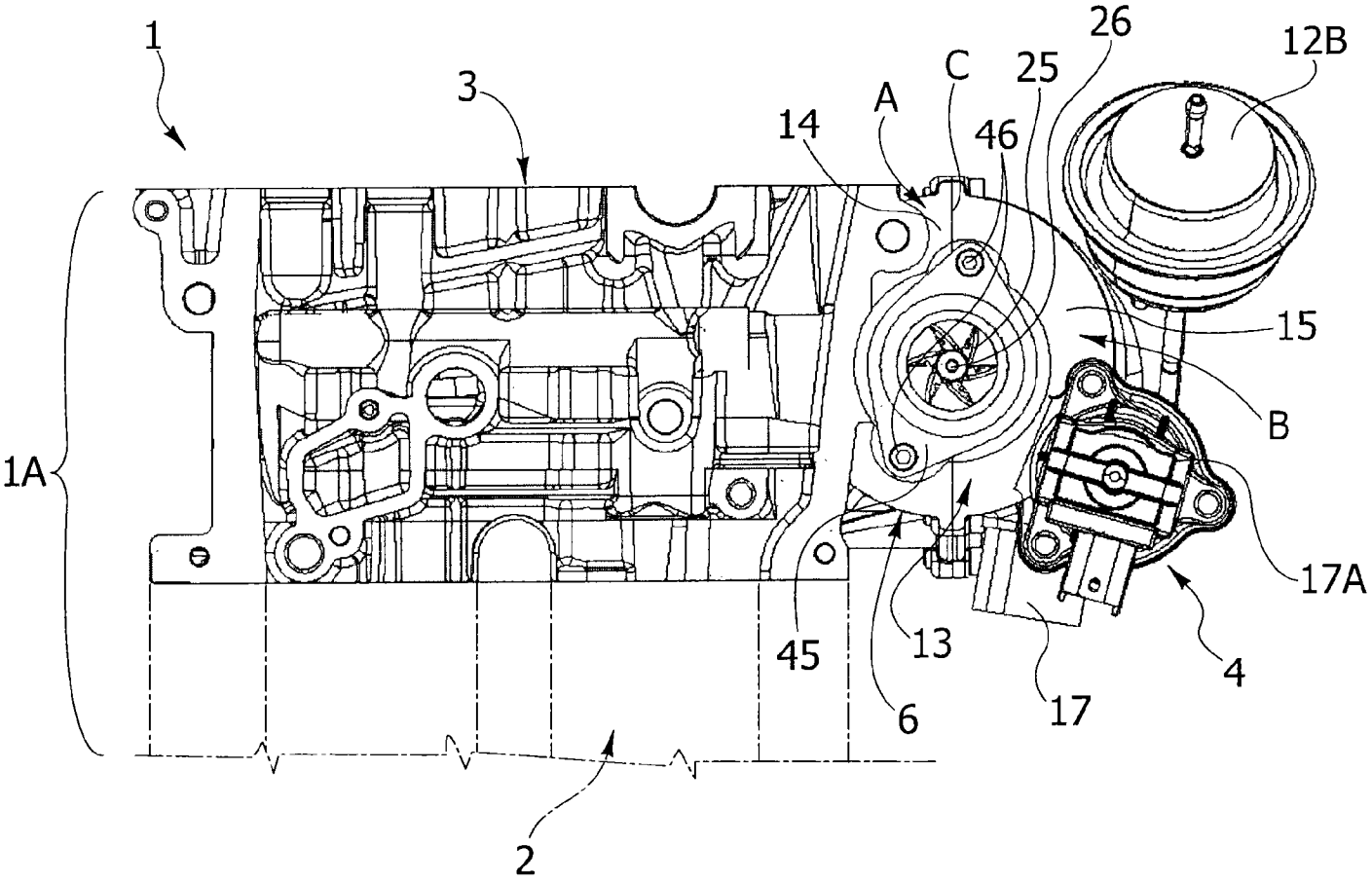
FIG. 1A is a view according to arrow I of FIG. 1.
Figure 2:
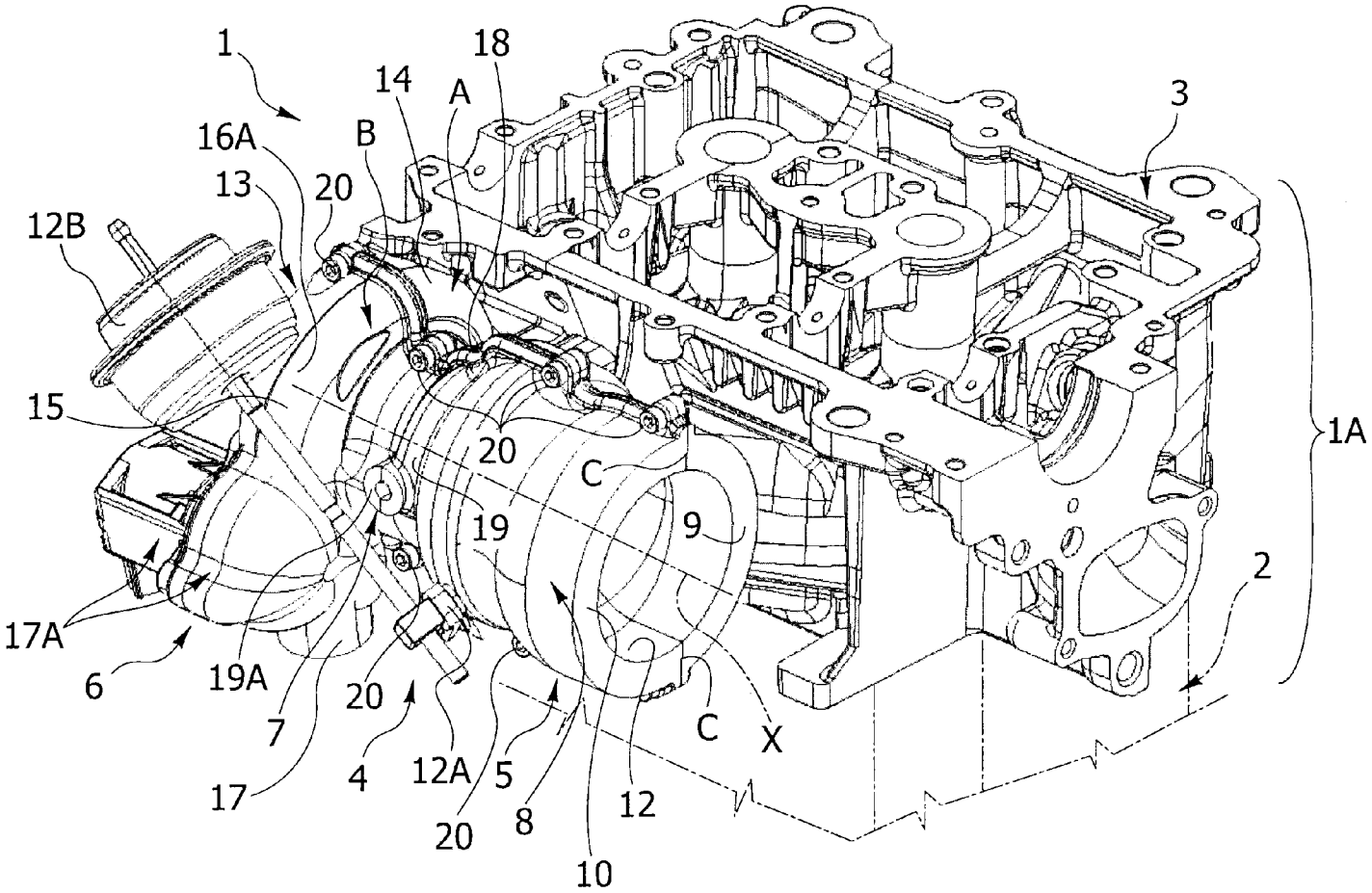
FIG. 2 is a view according to arrow II of FIG. 1.

An internal combustion engine according to the present invention is indicated with 1 in FIGS. 1, 1A, 2, 3. The internal combustion engine 1 comprises a motor unit 1A, in turn including a cylinder block 2 and a head 3, and a turbocharger assembly 4. The turbocharger assembly 4 comprises a turbine 5, a compressor 6 and a central body 7 interposed between the turbine 5 and the compressor 6. The turbine 5 comprises a body 8 including a first and a second portion 9, 10. In the present description the body 8 will at times also be indicated using the term "turbine body", with an entirely equivalent meaning.

An inlet port (not visible) in fluid dynamic communication with a volute 11 and with an outlet port 12A of said turbine, are provided in said first and second portion 9, 10. A boost pressure control valve (so-called "wastegate valve") is arranged in the turbine body 8 and it is actuated by means of an actuator 12B, preferably of the pneumatic type.

Analogously, the compressor 6 comprises a body 13 including a first portion 14 and a second portion 15 and further comprises, provided in said first and second portion 14, 15, an intake port 16, a volute 16A and an outlet port 17. A bypass valve 17A (so-called "dump valve") of the compressor 6 is fixed on the portion 15, in correspondence of the outlet port 17. In the present description the body 13 will also at times be indicated using the term "compressor body", with an entirely equivalent meaning.

The central body 7 comprises a first and a second portion 18, 19 and a hole 19A provided on the second portion 19. The first portions 9, 14, 18 are integral to each other and integral with the head 3. The second portions 10, 19, 15 are integral to each other and they are separable from the head 3. Thus, the turbocharger assembly 4 substantially comprises a first and a second semi-shell A, B put close together along a separation plane C, preferably with the interposition of a gasket (or, alternatively a sealing paste), and fixed to each other by means of threaded joints 20. In particular, the first semi-shell A is defined by the first portions 9, 14, 18 respectively of the turbine body 8, of the compressor body 13 and of the central body 7, while the second semi-shell B, separable from the first semi-shell A, is defined by the second portions 10, 15, 19 still, respectively, of the turbine body 8, of the compressor body 13 and of the central body 7.

The joining of the two semi-shells A, B substantially provides a stator assembly of the turbocharger assembly 4, i.e. an assembly of fixed parts. Thus the turbine body 8, the compressor body 13 and the central body 7 are part of the stator assembly.

Figure 3:
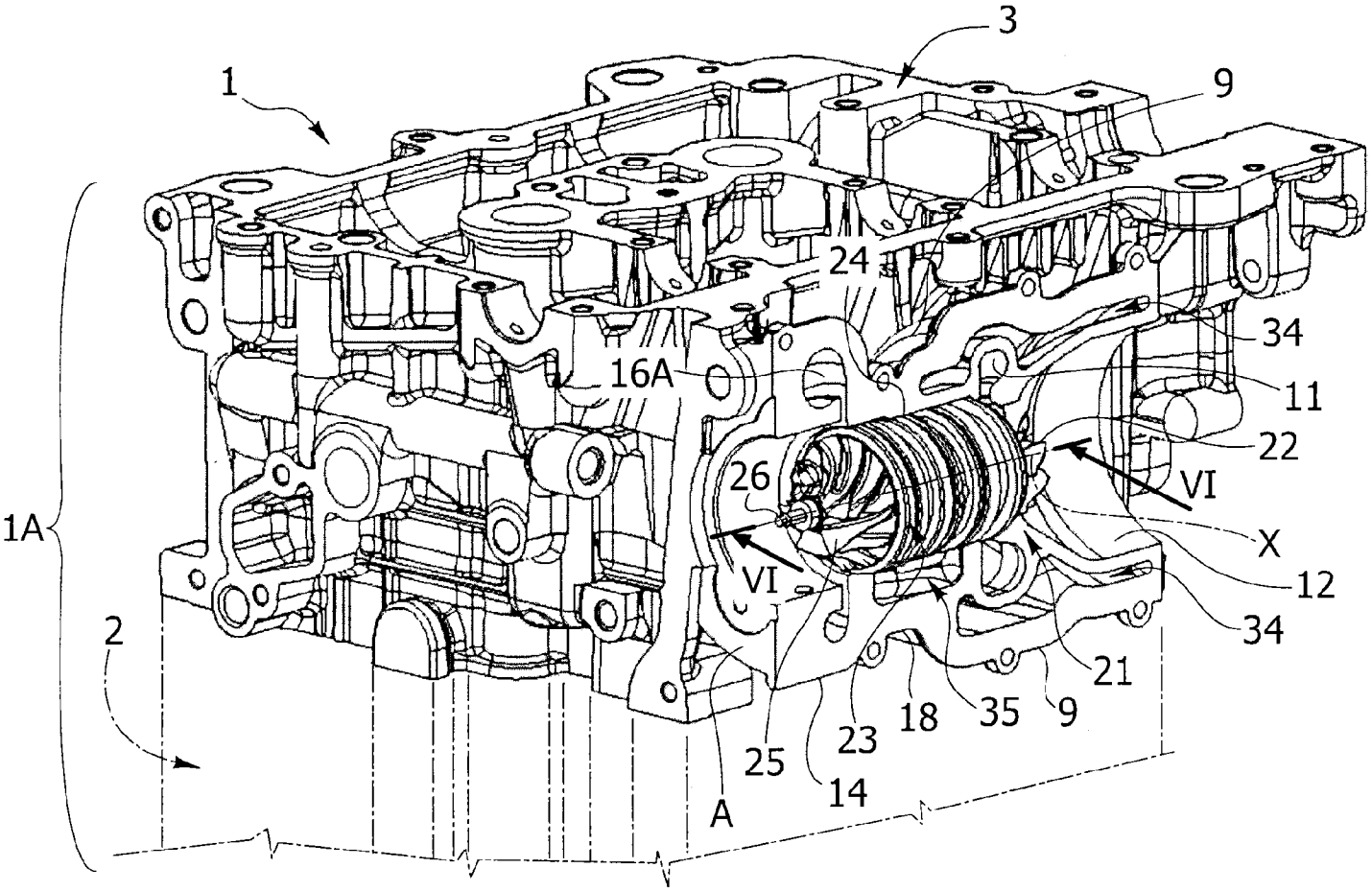
FIG. 3 is a perspective view corresponding to FIG. 1 but with some components removed for the sake of clarity.

Referring to FIG. 3, a rotor assembly 21—comprising a first impeller 22 rotatably mounted inside the turbine body 8, a bearing pack 23 housed in a cavity 24 of the central body 7—is installed in the turbocharger assembly 4. A lubrication channel 24A arranged for the passage of a pressurised lubricating fluid and hydraulically connected with a lubrication circuit of the engine 1 ends up inside the cavity 24 in correspondence of a hole 24B.

The rotor assembly further comprises a second impeller 25 rotatably mounted inside the body 13 of the compressor 6. The first and the second impeller 22, 25 are coaxial to each other and with respect to a rotation axis X (around which they are also rotatable) and they are rotatably connected to each other by means of a shaft 26.

Figure 4:
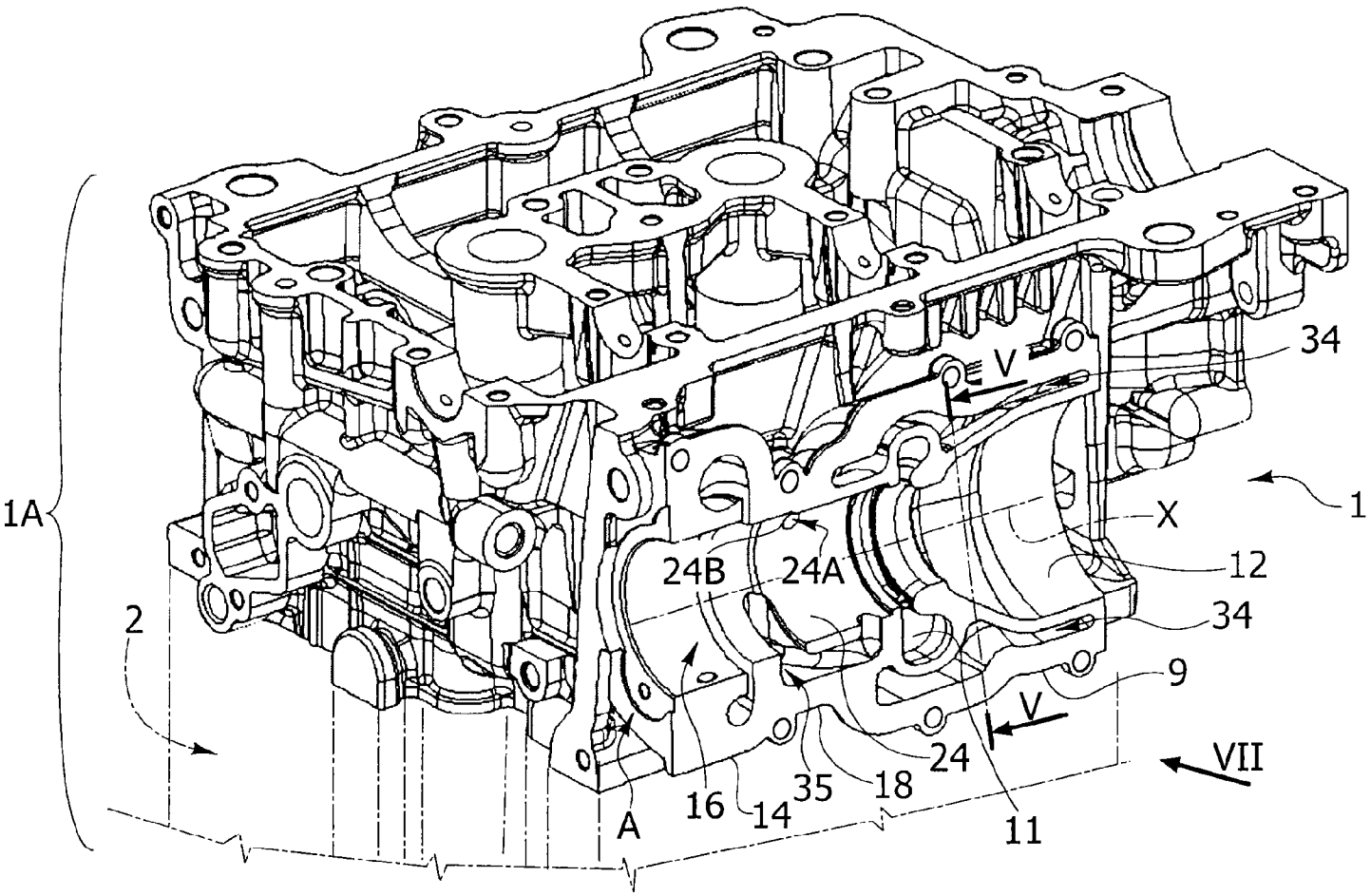
FIG. 4 is a view corresponding to FIG. 2 with further components removed.
Figure 6:
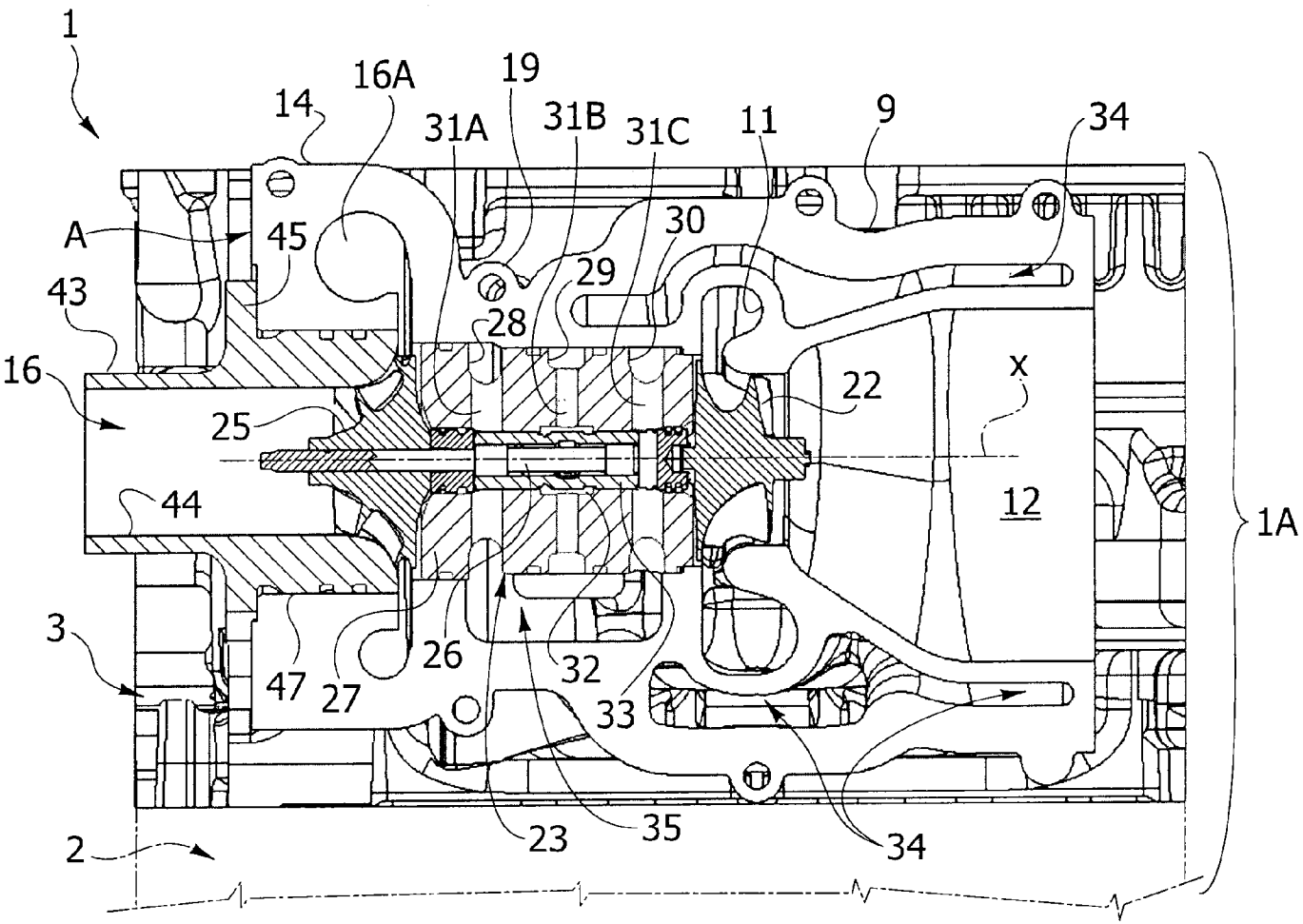
FIG. 6 is a sectional view according to line VI-VI of FIG. 3.
Figure 7:
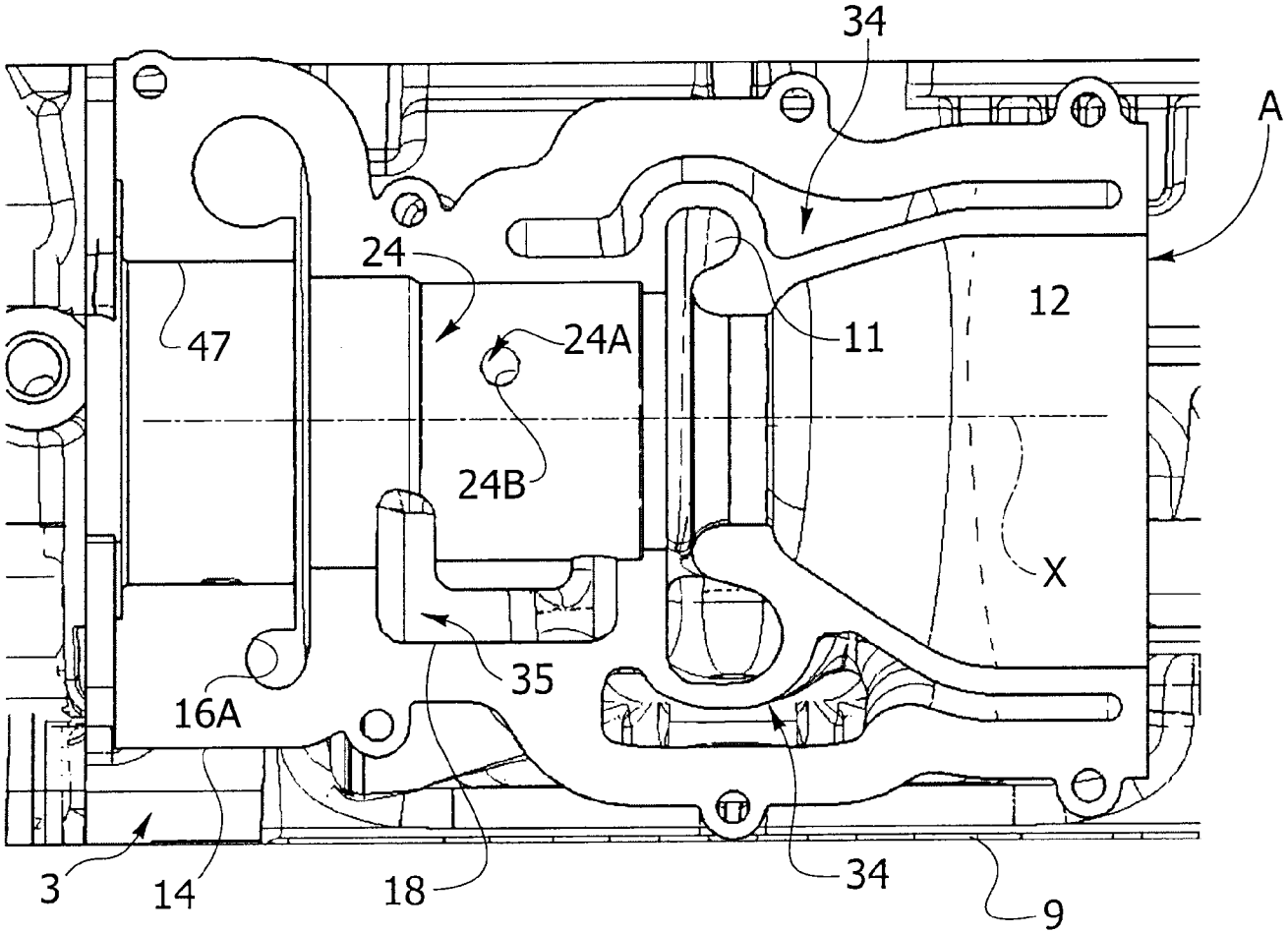
FIG. 7 is a view according to arrow VII of FIG. 4.

Referring to FIGS. 3, 4, 6, in this embodiment the bearing pack 23 comprises a sleeve 27 having a radial hole 27A and a plurality of annular grooves 28, 29, 30 in hydraulic communication, by means of respective radial channels 31A, 31B, 31C, with an internal cavity 32 provided in sleeve 27. When the rotor assembly 21 is inserted into the cavity 24, the groove 29 is also positioned in correspondence with the hole 24B and the radial hole 27A is located in correspondence with the hole 19A.

The shaft 26 which is rotatably supported by a bushing 33 is inserted into the internal cavity 32. In other embodiments, the rotor assembly 21 comprises a bearing pack of the rolling type. In any case, generally there are many other options for providing the bearing pack 23.

A jacket 34 arranged for the passage of a cooling fluid is provided in the body 8 of the turbine 5 and partly in the central body 7. Furthermore, a collection channel 35 arranged for the collection of lubricating fluid and in direct hydraulic communication with the grooves 28, 30 are provided in the central body 7.

The jacket 34 and the channel 35 are provided partly in semi-shell A, partly in semi-shell B. Each portion of the jacket and of the channel 35 is hydraulically connected to the respective portion provided on the second shell B when the first and the second shell A, B are joined together by means of the threaded joints 20.

Figure 5:
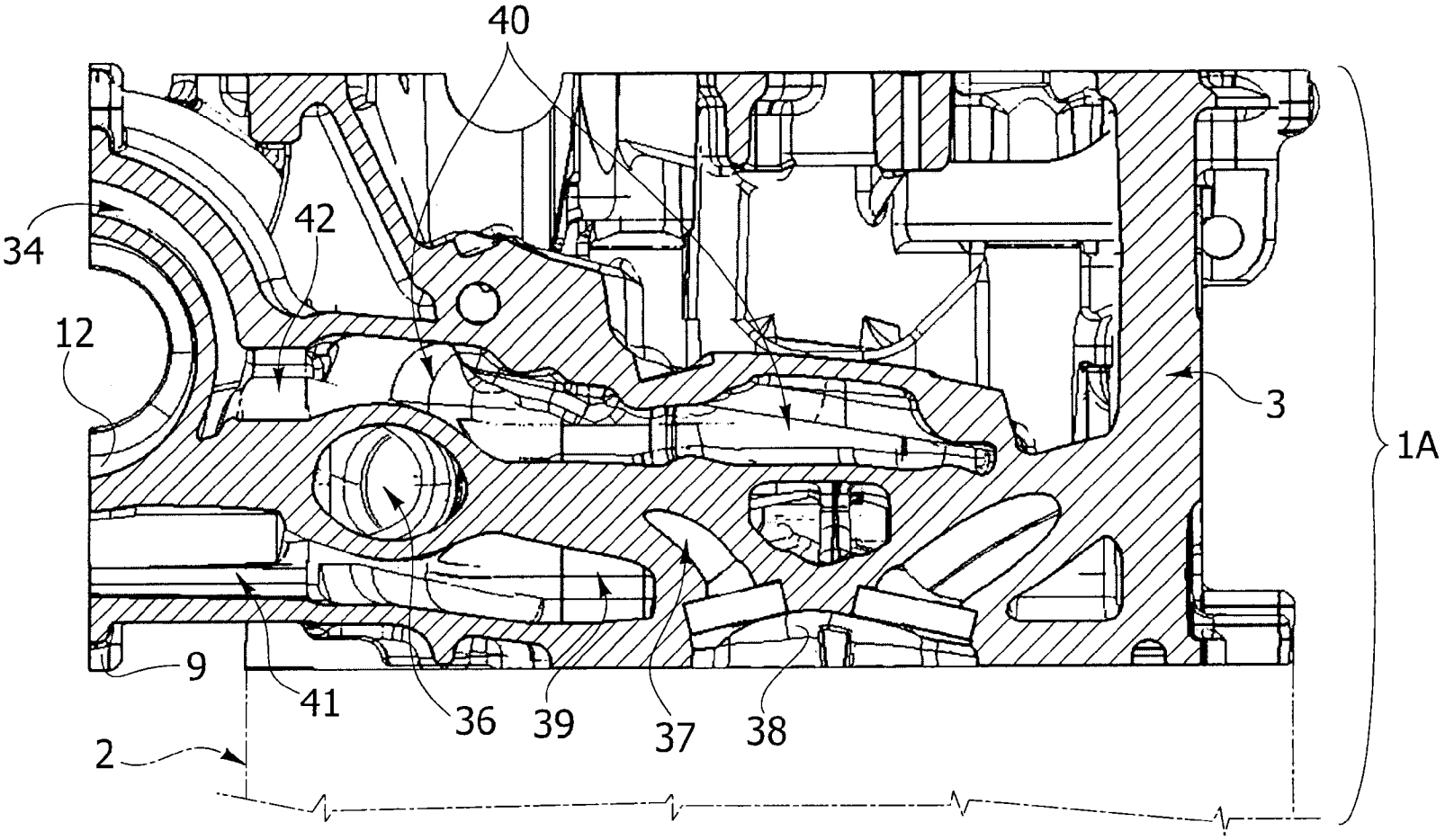
FIG. 5 is a sectional view according to line V-V of FIG. 4.

Firstly, referring to FIG. 5 and also to FIGS. 3, 4, the head 3 comprises an exhaust manifold 36 fluid dynamically connected to exhaust conduits 37 associated to each combustion chamber 38 provided in the head 3. The exhaust manifold 36 is cast integrally with the head 3 and it is surrounded by a cooling fluid circulating in a first and a second cooling jacket 39, 40, in hydraulic communication with a cooling circuit of the motor unit 1A of the internal combustion engine 1.

The jacket 34 provided within the body 8 of the turbine 5 and partly within the central body 7 is hydraulically connected, by means of an inlet channel 41 and an outlet channel 42 respectively to the first and to the second cooling jacket 39, 40.

The inlet and outlet channels 41, 42 are integrated in the turbocharger assembly 4, particularly in the stator assembly, in correspondence of a connection interface between the turbocharger assembly 4 itself and the internal combustion engine 1.

In the present description, the term "connection interface" is used to indicate a physical or geometric surface (ideal) along which the turbocharger assembly 4 and the motor unit 1A of the internal combustion engine 1, particularly the stator assembly of the turbocharger assembly 4 are joined to the head 3 of the motor unit 1A.

Thus, in the embodiment described herein, the connection interface between the turbocharger assembly 4 and the head 3 is a surface which ideally separates the semi-shell A from the head 3 though they are integrally cast together. Analogously, the channel 24A hydraulically connected to a lubrication circuit of the motor unit 1A is integrated in the turbocharger 4, particularly in the stator assembly, in correspondence of the abovementioned connection interface.

In other words, assuming to ideally separate the stator assembly from the head 3 (or, generally from the motor unit 1A) along the abovementioned connection interface (thus obtaining two complementary separation surfaces, one on the stator assembly and one on the head), the result would be a stator assembly having a series of terminal ports ending up on the separation surface thereof and corresponding, respectively, to channels 41, 42 and to channels 24A, 35 on one hand, and a head (preferably) which has, on the separation surface thereof, terminal ports corresponding to the jackets 39, 40 and to two channels hydraulically connected to the lubrication circuit of the motor unit 1A, wherein the terminal ports of the stator assembly and of the head would evidently be in homologous positions (the association is between the channels 41, 42 and, respectively, the jackets 39, 40 and between the channels 24A, 53 with the channels connected to the lubrication circuit of the motor unit 1A of the engine 1, whose type will be addressed further ahead). The interface between the two separation surfaces is evidently the abovementioned "connection interface".

Furthermore, a sleeve 43 having an internal channel 44 and a fastening flange 45 rigidly connected to the body 13 of the compressor 6 by means of threaded joints 46 is mounted in correspondence of the inlet port 16. It should be observed that the diameter of the channel 44 defines the geometric passage section in the inlet port 16. The sleeve 43 is inserted into a hole 47 provided on the body 13 of the compressor 6 in correspondence of the inlet port 16.

The internal combustion engine 1 operates as follows.

The exhaust gases which are generated following the combustion of the air/fuel mixture inside the combustion chambers traverse the exhaust conduits 37 and are collected by the exhaust manifold 36, which is fluid dynamically connected with the inlet port of the turbine 5.

Thus, the exhaust gases flowing out into the volute 11 and flowing out from the outlet port 12 rotate the first impeller 22 which thanks to the shaft 26 brings the second impeller 25 in rotation. The latter intakes air through the inlet port 16, particularly through the channel 44 and conveys it, compressing it, into the body 13 of the compressor 6 wherefrom, through the outlet port 17, it is delivered to the intake of the internal combustion engine 1, typically after an intercooling step.

The head 3 is preferably made of an aluminium alloy as well as the shells A, B. In order to avoid the melting of the stator assembly, particularly the turbine body 8, due to the high temperatures reached by the exhaust gases, both in the case of compression ignition engines and in the case of spark ignition engines (for which the exhaust temperatures are definitely higher), a cooling fluid coming from the internal combustion engine 1 passes from the jacket 39 through the inlet channel 41 and flows into the jacket 34 within the turbine body 8 and within part of the central body 7.

Thus, the water traverses the jacket 34 and cools the body 8 and the central body 7 flowing out at a higher temperature through the outlet channel 42 and then returns to the cooling circuit of the motor unit 1A through the jacket 40.

Simultaneously, the lubrication channel 24A, in hydraulic communication with the lubrication circuit of the motor unit 1A, contains lubricating fluid, particularly lubricating oil, which through the groove 29 and the corresponding channel 31B lubricates the internal cavity 32 and bushing 33, allowing high rotation speeds of the shaft 26 and of the impellers 22, 25.

The lubricating oil is then forced towards the radial channels 31A, 31C and therefrom towards the annular grooves 28, from which it is collected within the channel 35 for recirculation within the lubrication circuit. The channel 35 is in fact hydraulically connected to a return line of the lubricant which propagates from the head 3 towards the cylinder block 2. It should be observed that the heating of the oil is prevented by the cooling fluid which circulates in the jacket 34 and which lowers the temperature of the turbine body 8 and also of the central body 7.

The internal combustion engine 1 according to the invention has a considerable number of advantages with respect to the internal combustion engines of the known type.

In the first place, the pipings, the fittings and the gaskets required for the hydraulic connection between the channels for the lubricating fluid and the cooling fluid normally located on the central body of the turbochargers of supercharged engines of the known type are eliminated. Furthermore, the number of components that form the turbocharger assembly 5 is considerably lower with respect to the internal combustion engines of the known type, given that the turbocharger assembly 5 substantially comprises the first and the second shell A, B, the rotor assembly 23 and the sleeve 43. This, combined with the elimination of the pipings, the fittings and the gaskets allows considerably reducing the production costs of the turbocharger assembly 5 and of the entire internal combustion engine 1.

However, given that the shells A, B are preferably made of aluminium, it is also possible to obtain considerable saving on the type of material. Actually, by using the jacket 34 for cooling the turbine body 8 (and the central body 7), it is possible to avoid using the expensive Nimonic® superalloys to the advantage of using aluminium which has a definitely much lower cost.

In addition to what has been described above, it should also be observed that the internal combustion engine 1 according to the invention also has several indisputable advantages in terms of the mechanical machining operations on the turbocharger assembly 4. Actually, in order to obtain mechanical machining operations that are accurate and capable of ensuring the dimensional tolerances required for such application, a preferred machining method for the turbocharger assembly 4 is the following.

The head 3 and the shell A, provided in a single piece, are temporarily joined to the shell B, provided separately. In this step, neither the sleeve 43 nor the rotor assembly 21 are assembled.

The internal cavity 24 of the central body 7 is thus machined, for example by means of various types of tools (for example boring tools or the like), to obtain the combination of surface finishing and geometric tolerances required for the insertion of the rotor assembly 21.

Then, after the temporary separation of the two shells A, B for the removal of chips possibly accumulated following the mechanical finishing, the two semi-shells are put close together once again and fastened by means of threaded joints 20, the rotor assembly 21 pre-assembled as shown in FIG. 3 is inserted axially along the axis X through the hole 47. In particular, the diameter of the hole 47 must be sufficiently wide to allow the insertion of the rotor assembly 21. The axial blocking of the rotor assembly 21 inside the cavity 24 is ensured by inserting a pin or a threaded dowel into the holes 19A and 27A, which, as described previously, are aligned when the rotor assembly is inserted into the cavity 24.

Lastly, the sleeve 43 is fitted into the hole 47 and it is fastened to the turbocharger assembly 4 by means of the threaded joints 46.

Figure 8:
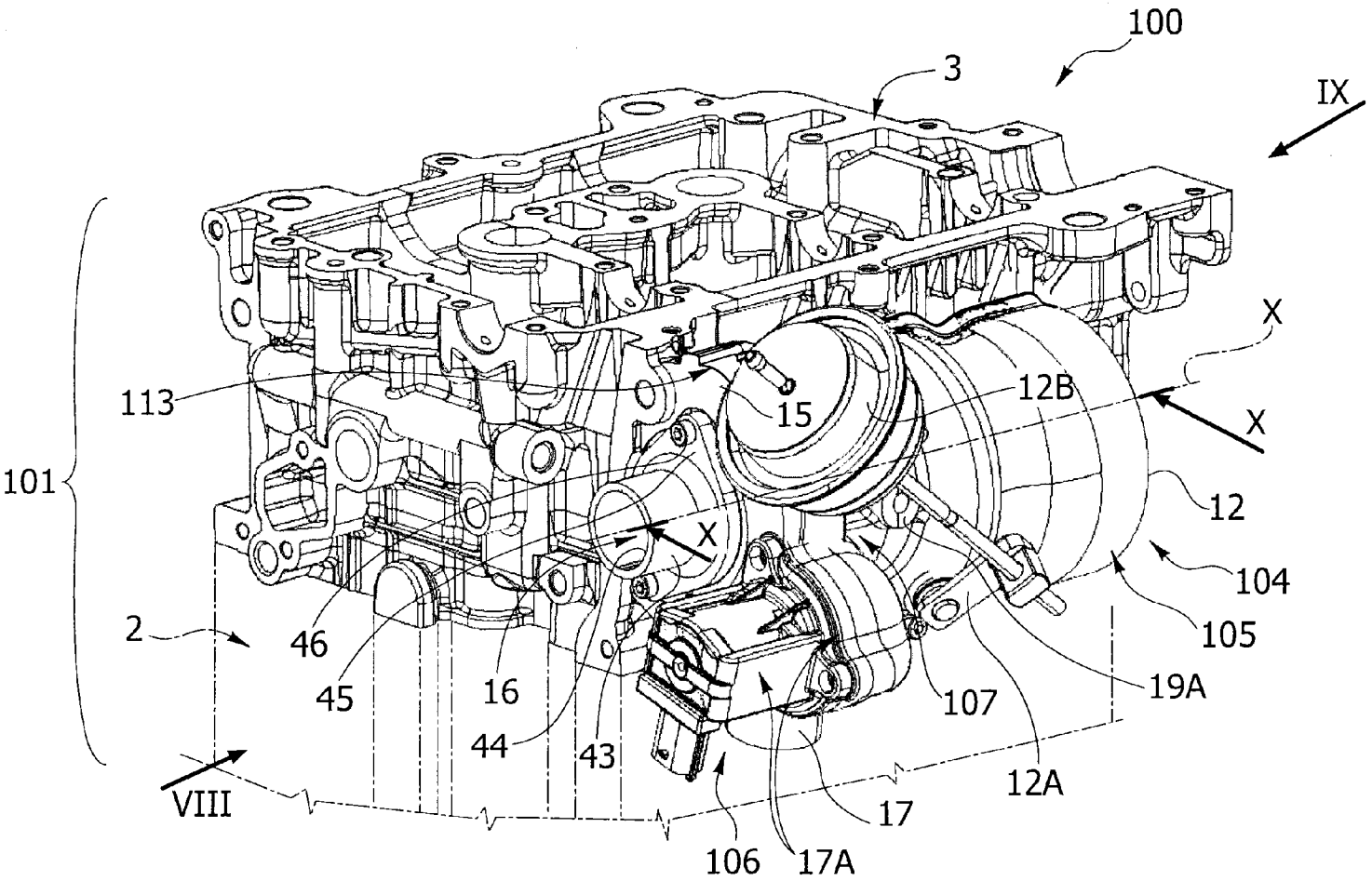
FIG. 8 is a perspective view of a first variant of the internal combustion engine according to the invention.
Figure 8A:
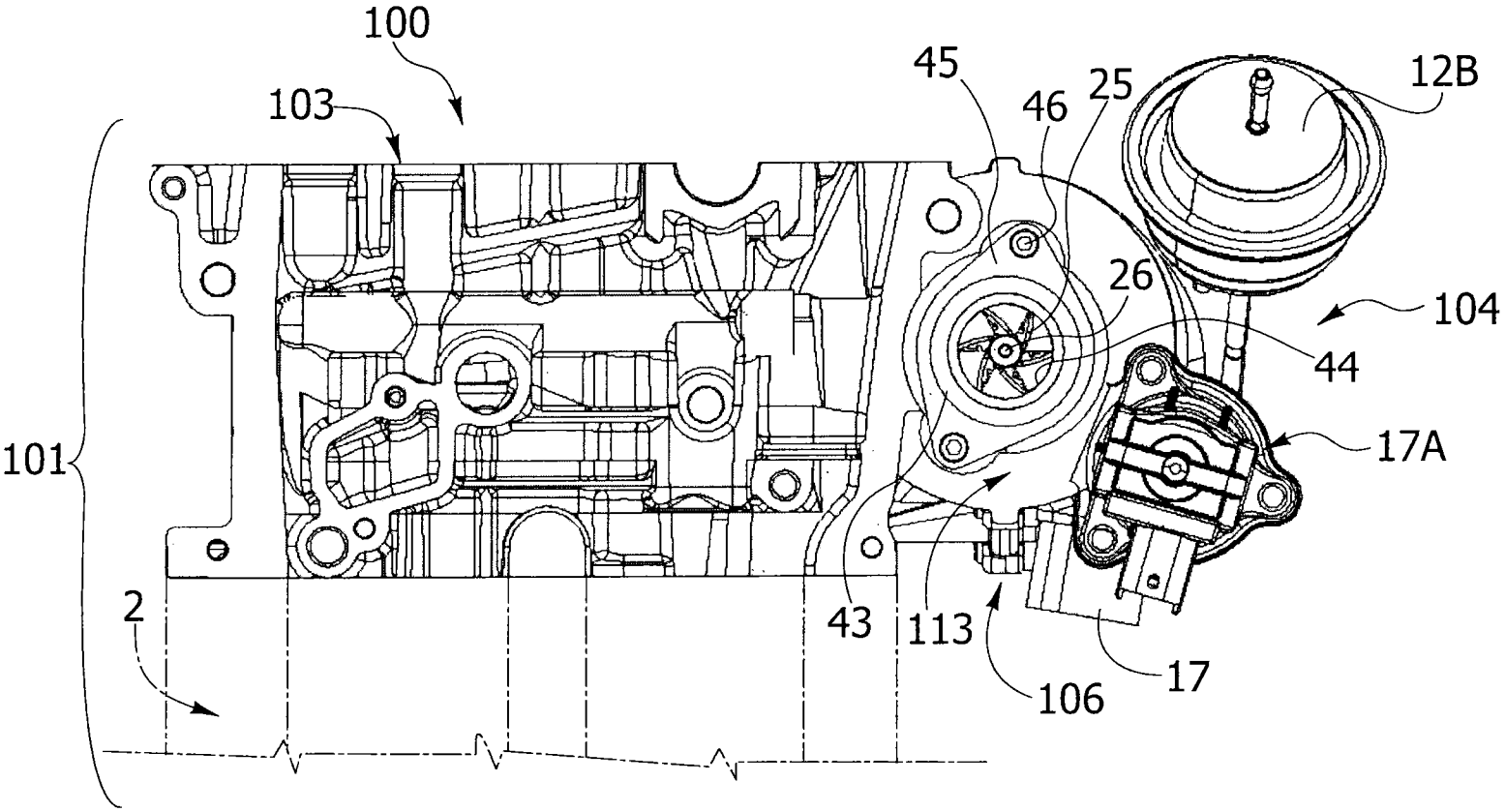
FIG. 8A is a view according to arrow VIII of FIG. 8.
Figure 9:
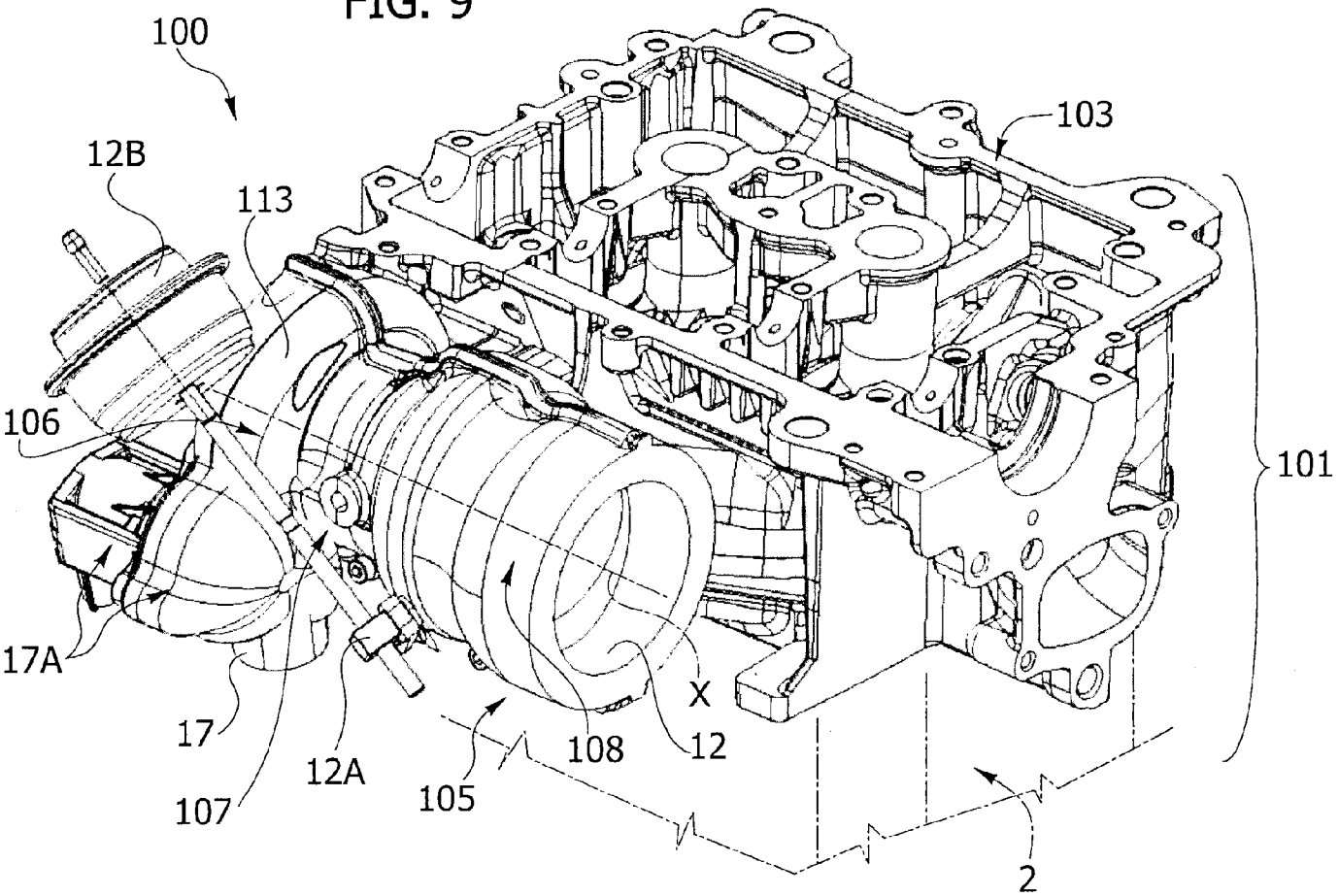
FIG. 9 is a view according to arrow IX of FIG. 8.

Referring to FIGS. 8, 8A, 9, an advantageous variant of an internal combustion engine according to the invention is indicated with 100. The components identical to those described previously regarding the internal combustion engine 1 are indicated using the same reference number. The internal combustion engine 100 comprises a motor unit 101, in turn including the cylinder block 2 and a head 103, and a turbocharger assembly 104.

The turbocharger assembly 104 comprises a turbine 105, a compressor 106 and a central body 107 interposed therebetween. The turbine 105 and the compressor 106 comprise respective bodies 108, 113 integral with the central body 107. In the present description, the body 108 of the turbine 105 will at times be indicated using the term "turbine body", with an equivalent meaning.

Similarly, the body 113 of the compressor 106 will at times be indicated using the term "compressor body", with an equivalent meaning.

Analogously to the turbocharger assembly 4, the bodies 108, 113 and 107 define a stator assembly of the turbocharger assembly 104.

The bodies 108, 113 and the central body 107 are cast integrally with the head 103. It should be observed that, substantially, this variant differs from the internal combustion engine 1 solely due to the fact that the stator assembly of the turbocharger assembly 104 does not comprise the semi-shells A, B, which—on the contrary—are made in a single piece together and with the head 103.

The head 103 is furthermore substantially identical in the structure outside and inside the head 3—in particular it comprises the exhaust manifold 36 integrally cast therein and fluid dynamically connected to an inlet port of the turbine 105 and the jackets 39, 40—obviously except for the fact that the entire stator assembly of the turbocharger assembly 104 is integral therewith, not a single semi-shell as in the case of the head 3.

Figure 10:
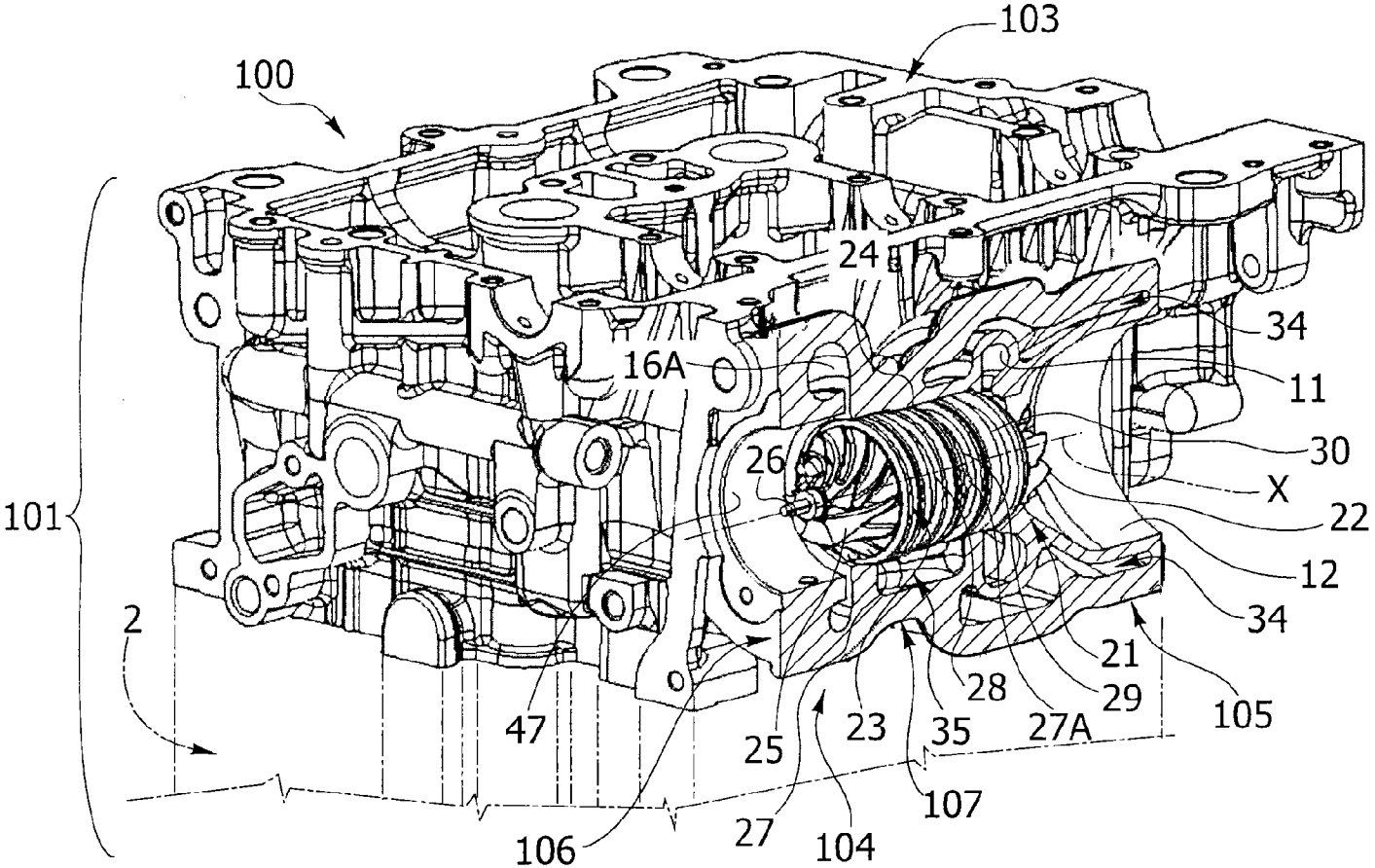
FIG. 10 is a partly sectioned view according to line X-X of FIG. 8.
Figure 11:
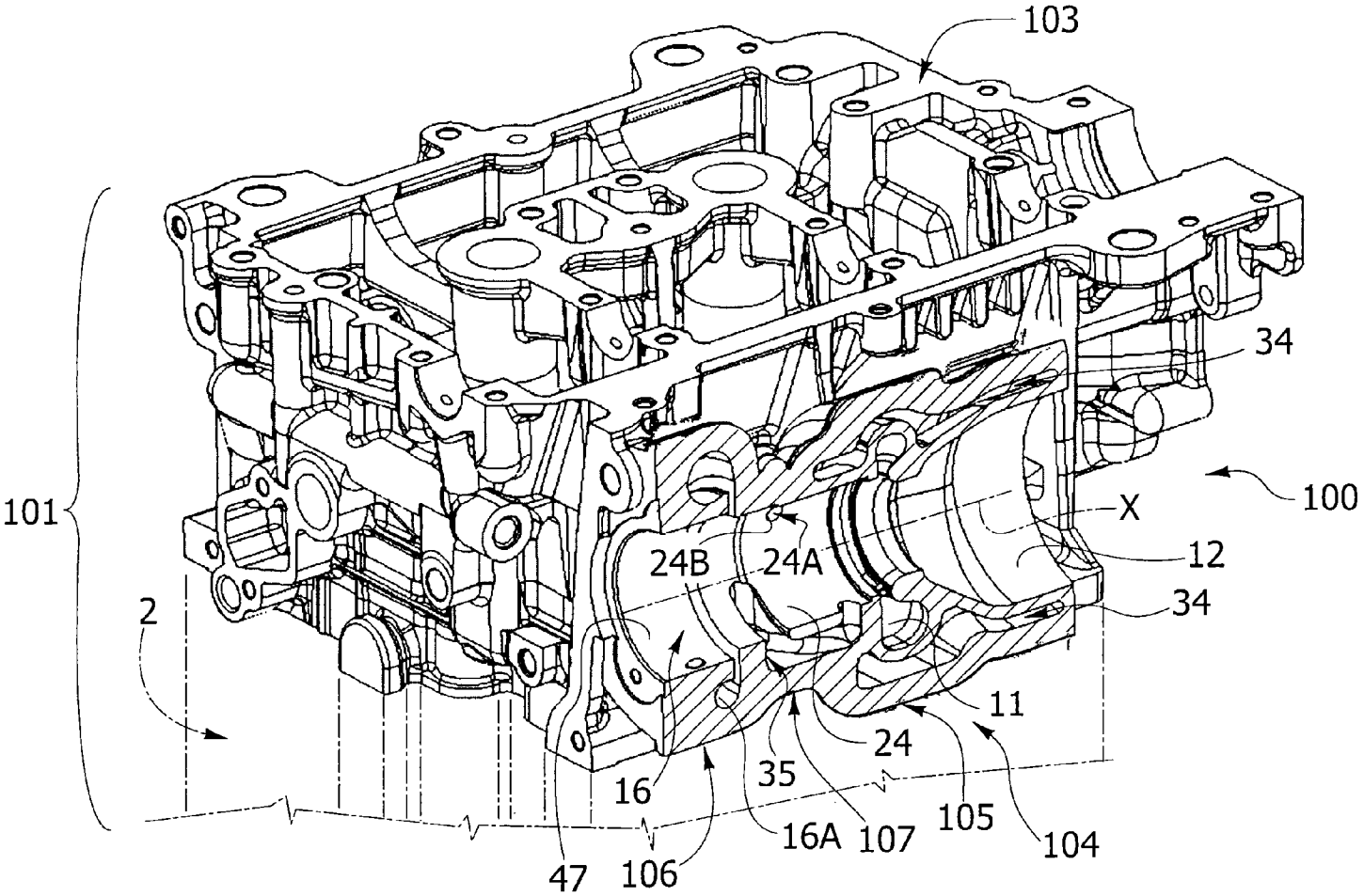
FIG. 11 is a view corresponding to FIG. 8 but with some components removed for the sake of clarity.

The internal structure of the turbocharger assembly 104 (FIG. 10, 11) is also identical, wherein

- the turbine 105 comprises the volute 11, the outlet port 12, the wastegate valve 12B and the jacket 34, which are in such case provided without interruption in the turbine body 108 and in part of the central body 107,
- the compressor 106 comprises, all provided without interruption, the inlet port 16, the volute 16A, the outlet port 17 and the bypass valve (dump valve) 17A;
- the central body 107, alongside a part of the jacket 34, comprises the hole 19A, and the cavity 24 with the lubrication channel 24A and the hole 24B, wherein the cavity 24 accommodates the rotor assembly 21 comprising the bearing pack 23, the first impeller 22 rotatably mounted within the turbine body 108 and the second impeller 25 rotatably mounted within the compressor body 113.

Furthermore, the collection channel 35, also in this case provided without interruption, is arranged in correspondence of the central body 107.

Analogously to the internal combustion engine 1, the sleeve 43 inserted into the hole 47 provided in the compressor body 113 and flanged to the same compressor body 113 by means of the threaded joints 46 is furthermore present.

The method for machining and mounting the turbocharger assembly 104 is substantially identical to that described regarding the turbocharger assembly 4, with the obvious absence of the step of temporarily joining the shells A, B which are in such case made in a single piece together. Analogously to the turbocharger assembly 4, the rotor assembly 21 is axially inserted through the hole 47 in the internal cavity 24, and it is axially blocked by means of a pin or threaded dowel inserted into the holes 19A, 27A.

It should also be observed that the geometry of the turbocharger assembly may vary slightly with respect to what has been illustrated by way of example given that, depending on the process used for the casting of the head 103 and of the turbocharger assembly 104 (for example die casting or lost foam casting), it may require arranging one or more holes, for supporting the casting cores, subsequently closable by means of plugs.

The engine 100 preserves the same advantages described regarding the internal combustion engine 1 and it further amplifies some of them. In particular, the number of components required for assembling the turbocharger assembly 104 is further reduced in this case because the stator assembly is substantially cast integrally with the head 103 and both are preferably made of an aluminium alloy.

Referring to FIGS. 12 to 18, a second variant of a turbocharged internal combustion engine according to the present invention is indicated with 200. The components identical to those described previously regarding the engines 1, 100 are indicated using the same reference number and have an analogous function.

The internal combustion engine 200 comprises a motor unit 201, in turn including the cylinder block 2 and a head 203, and a turbocharger assembly 204. The turbocharger assembly 204 comprises a turbine 205, a compressor 206 and a central body 207 interposed therebetween. The turbine 205 comprises a body 208 (in the present description also indicated, with analogous meaning, using the term "turbine body") including a first connection flange 209 in correspondence of which an inlet port 210 (FIG. 15A), a volute 211 and an outlet port 212 (FIG. 16) end up. Analogously to the turbines 5, 105, the turbine 205 comprises a wastegate valve controlled by an actuator, preferably pneumatic, (wastegate valve and respective actuator were removed for the sake of clarity).

Figure 12:
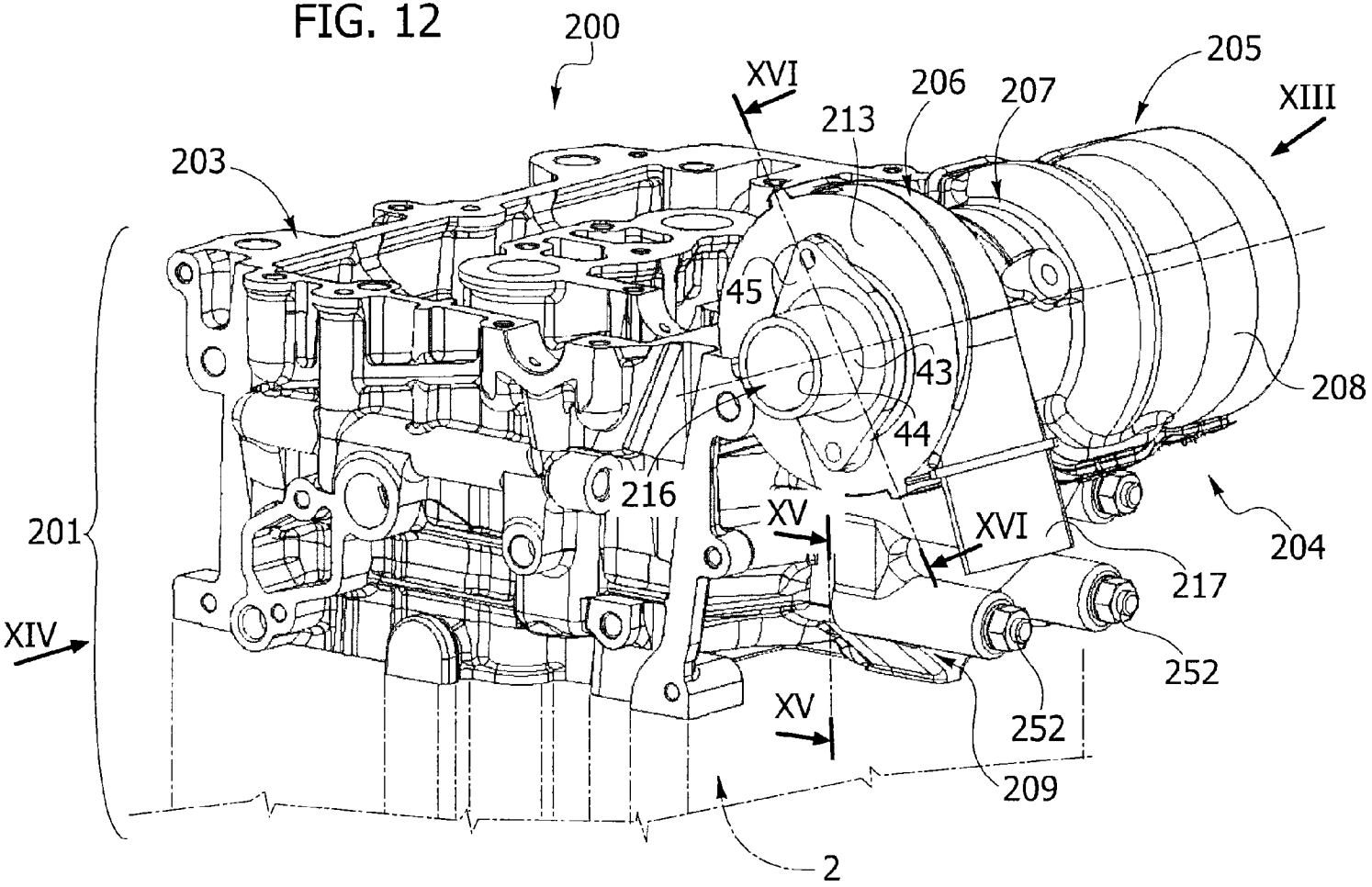
FIG. 12 is a perspective view of a second variant of the internal combustion engine according to the present invention.
Figure 13:
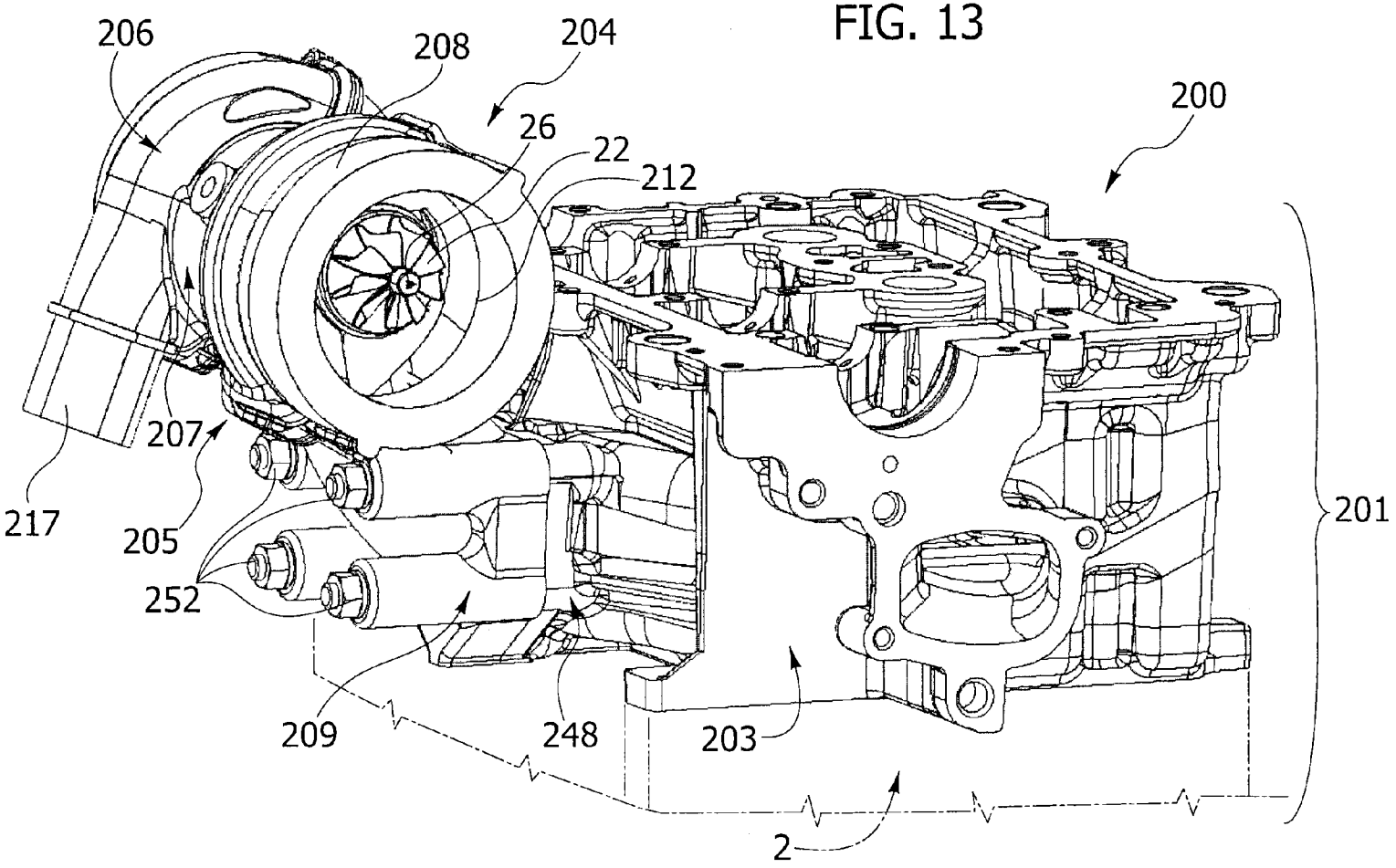
FIG. 13 is a perspective view according to arrow XIII of FIG. 12.
Figure 14:
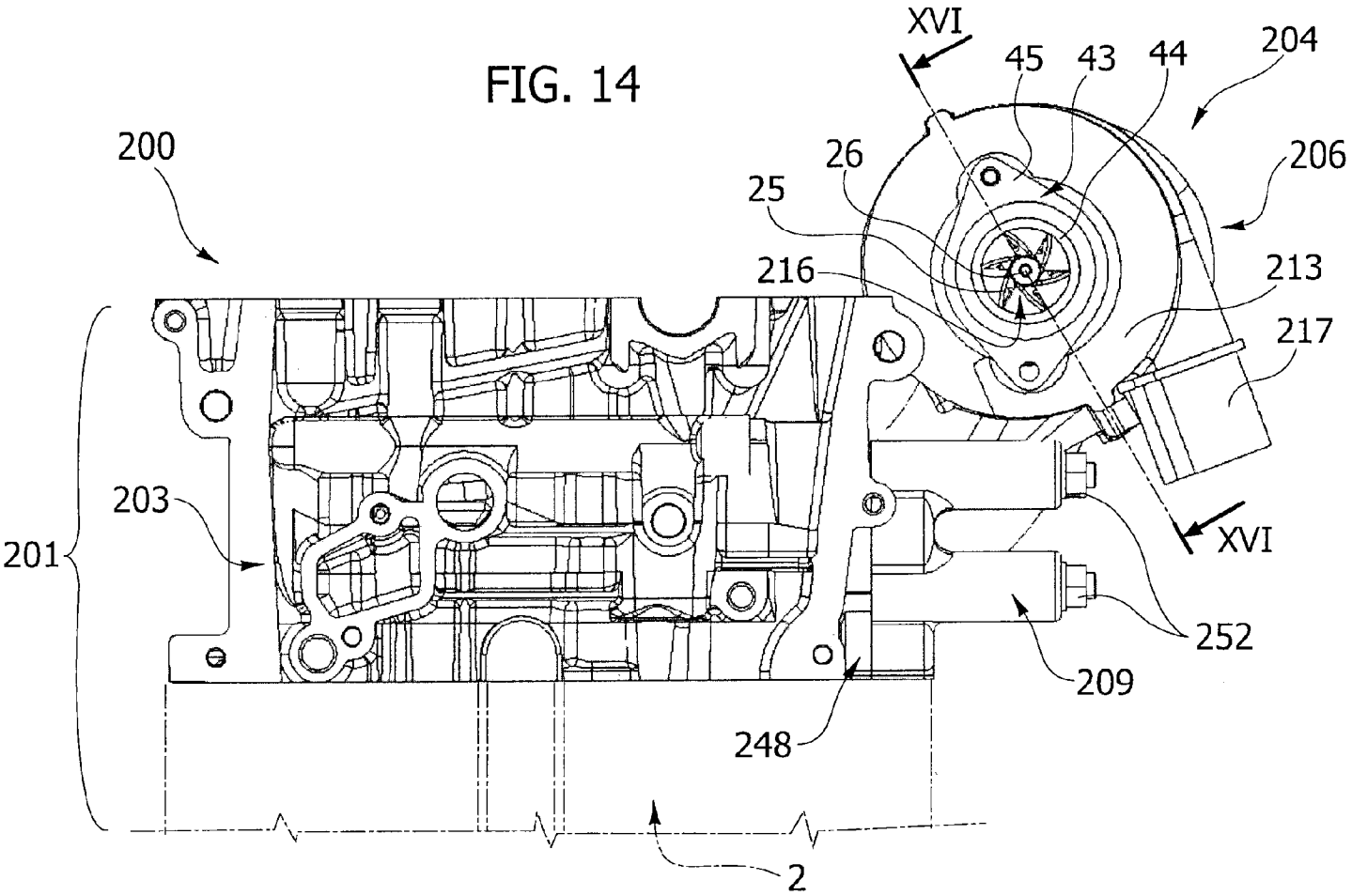
FIG. 14 is a view according to arrow XIV of FIG. 12.
Figure 16:
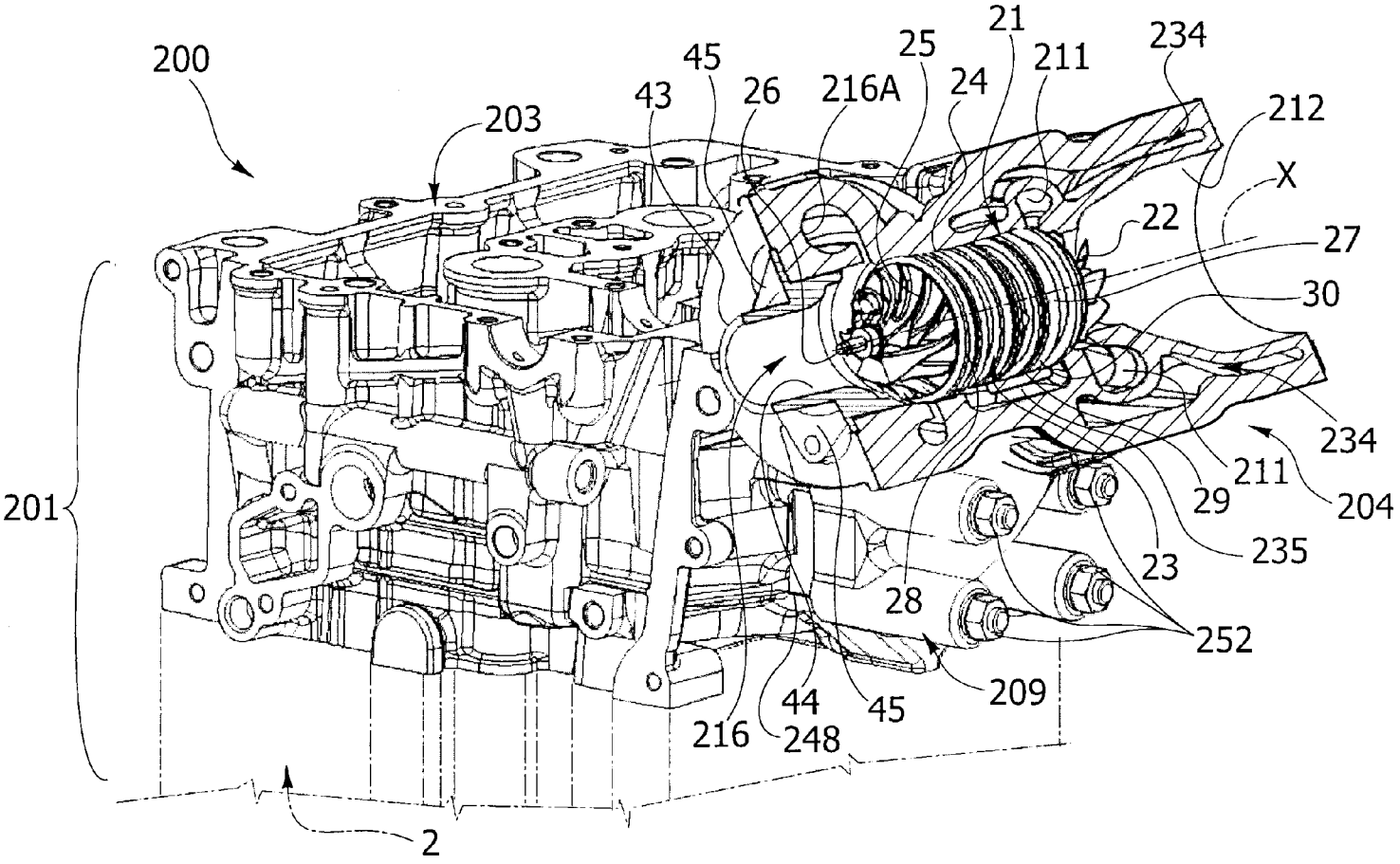
FIG. 16 is a perspective view partly sectioned according to line XVI-XVI of FIG. 12.

Referring to FIGS. 12, 16, the compressor 206 comprises a body 213 (in the present description also indicated, with analogous meaning, using the term "compressor body"), an intake port 216, a volute 216A and an outlet port 217, in correspondence of which, analogously to the compressors 6, 106, a bypass valve (dump valve), herein removed for the sake of clarity, is mounted.

Similarly to the turbocharger assemblies 4, 104, the turbocharger assembly 204 comprises a stator assembly defined by the bodies 208, 213 and by the central body 207. Furthermore, the central body 207, the turbine body 208 and the compressor body 216 are preferably made in a single piece.

Figure 17:
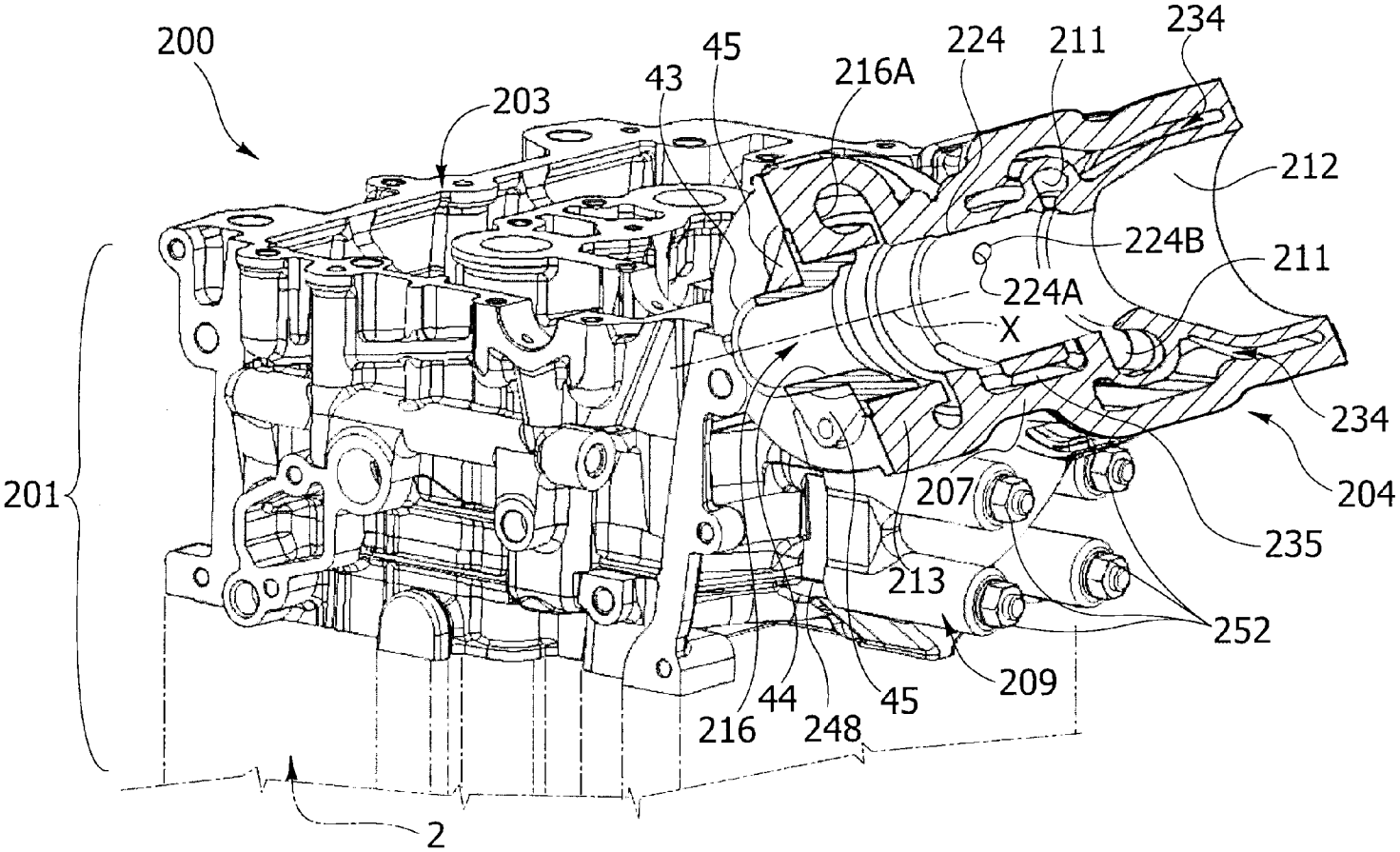
FIG. 17 is a view corresponding to FIG. 16 but with some components removed for the sake of clarity.

Referring to FIGS. 16, 17, within the central body 207 there is housed the rotor assembly 21 comprising the first impeller 22 rotatably mounted in the turbine body 208, the bearing pack 23 housed in the cavity 224, in which a lubrication channel 224A ends up by means of a hole 224B. The lubrication channel 24A is integrated in the stator assembly in correspondence of the connection flange 209, wherein it ends up with a terminal port 224C.

The rotor assembly 21 further comprises the second impeller 25, rotatably mounted in the compressor body 213. The first and the second impeller 22, 25 are coaxial to the axis X and rotatably connected by means of the shaft 26.

The further components of the rotor assembly 21 will not be described in detail again because they are identical to those described previously. Furthermore, analogously to what has been described previously, the rotor assembly 21 is arranged for the insertion in axial direction into the turbocharger assembly 204, particularly into the cavity 224.

Figure 15:
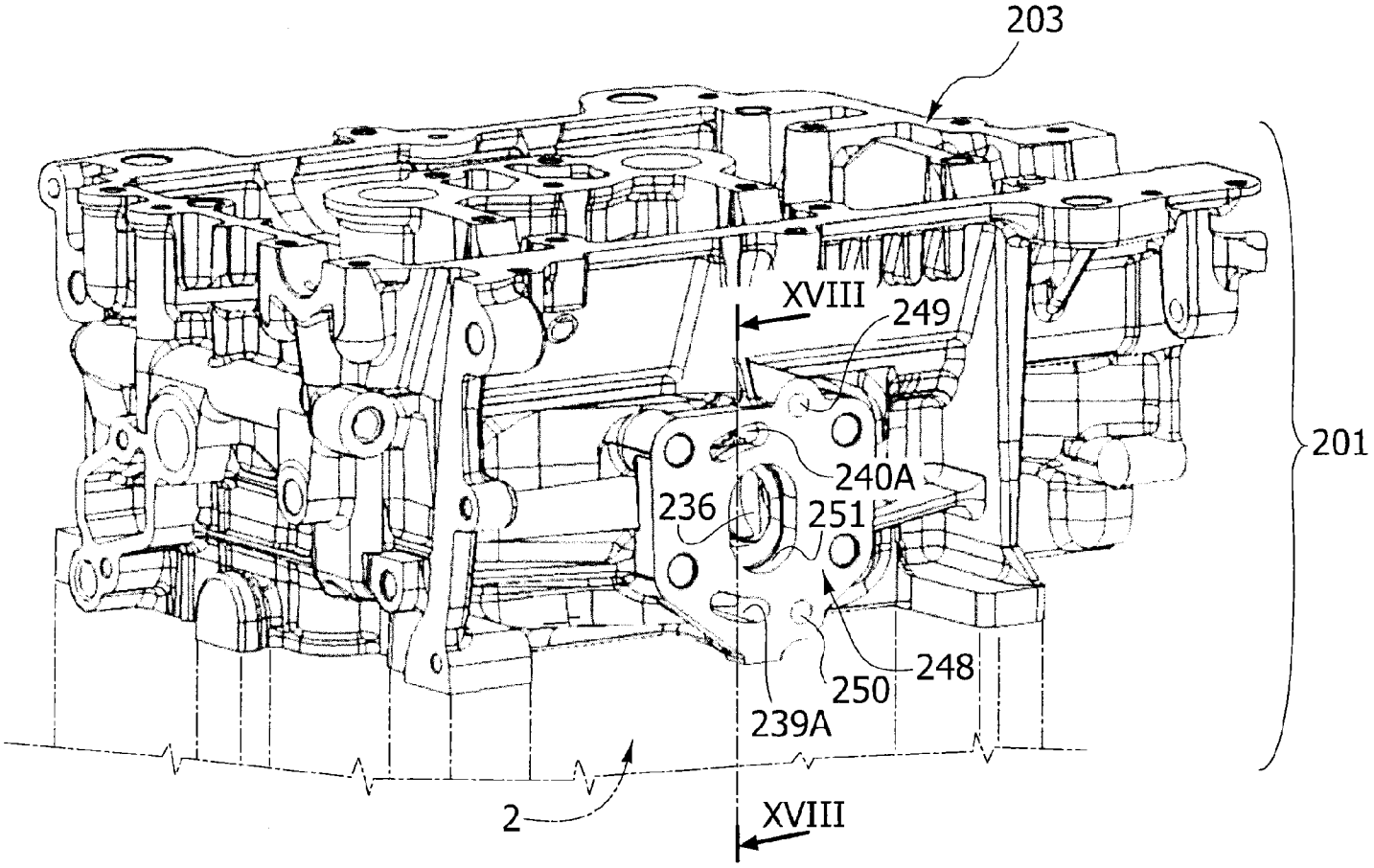
FIG. 15 is a view corresponding to FIG. 12 but with some components removed.
Figure 15A:
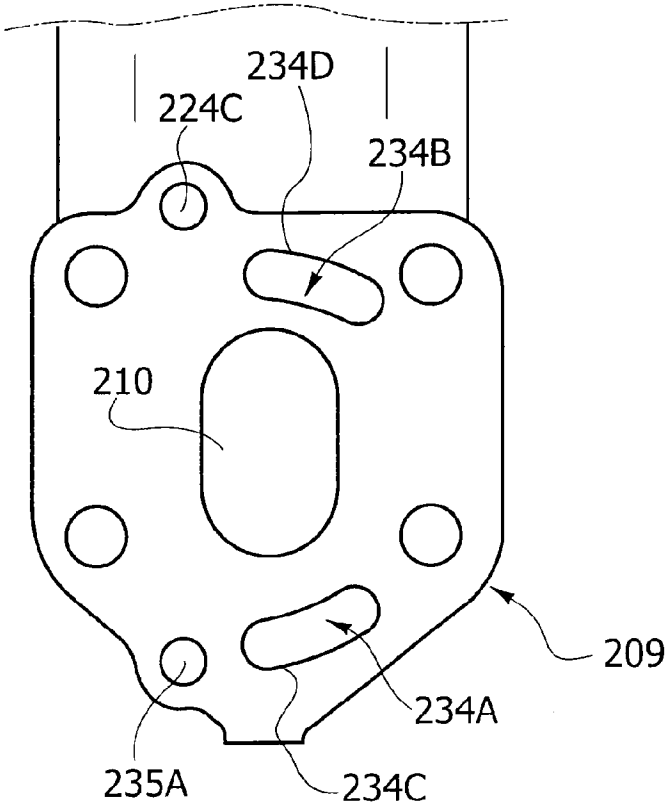
FIG. 15A is a schematic view according to arrow XV of FIG. 12.

Referring to FIGS. 15A, 16, 17, within the turbine body 208 and in part within the central body 207 there is provided a jacket 234 in hydraulic communication with an inlet channel 234A and an outlet channel 234B integrated in the stator assembly in correspondence of the connection flange 209 and ending up thereon by means of respective terminal ports 234C, 234D. Furthermore, a collection channel 235 analogous to the channel 35 of the assemblies 4, 104 is provided in the stator assembly of the turbocharger assembly 204. The channel 235 is in part integrated within the connection flange 209 and ends up thereon with a terminal port 235A. Substantially, four terminal ports 224C, 234C, 234D and 235A are provided in correspondence of the connection flange 209.

Figure 18:
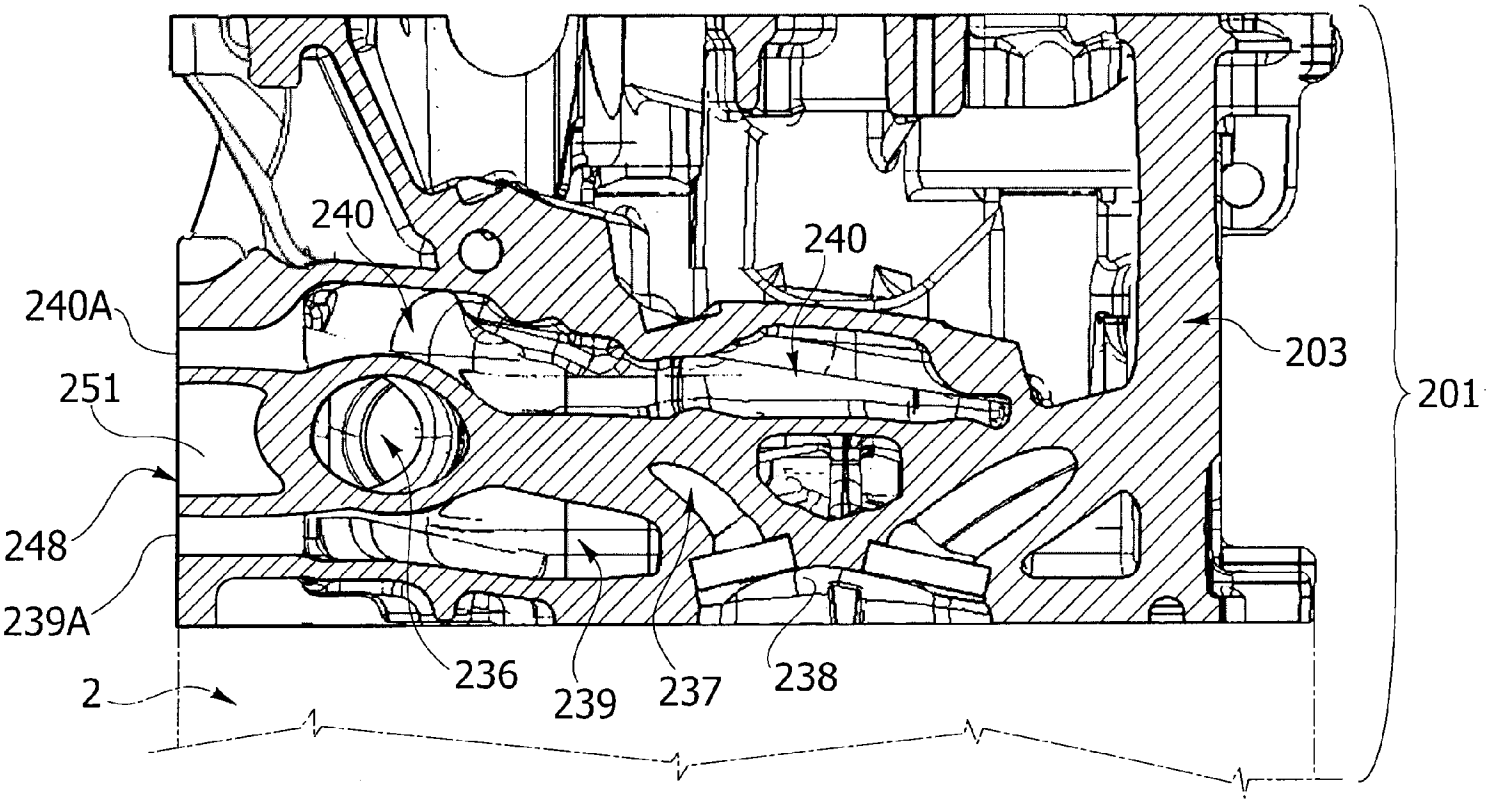
FIG. 18 is a sectional view according to line XVIII-XVIII of FIG. 15.

Referring to FIGS. 15, 18, the head 203 comprises an exhaust manifold 236 cast integrally therewith and fluid dynamically connected to exhaust conduits 237 associated to respective combustion chambers 238.

The exhaust manifold 236 is surrounded by a first and a second cooling jacket 239, 240 which end up, by means of terminal ports 239A, 240A, in correspondence of a second connection flange 248. Furthermore, ending up in correspondence of the connection flange 248 are:

- two terminal ports 249, 250 hydraulically connected to the lubrication circuit of the motor unit 201 of the engine 200 and in positions homologous to those of the terminal ports, respectively, 224C and 235A;
- the exhaust manifold 236 by means of an outlet port 251 substantially shaped identically to the inlet port 210 on the flange 209 and in homologous position with respect thereto.

In particular, the terminal port 249 is connected to the pressurized branch of the lubrication circuit of the motor unit 210, while the port 250 is connected to a return branch of the lubricant, at low pressure.

The turbocharger assembly 204 and the head 203 are coupled by means of mechanical connection of the first and of the second connection flanges 209, 248 (preferably by means of threaded joints 252): in such manner the flanges 209, 248 define a connection interface between the turbocharger assembly and the motor unit 201, in particular the head 203. Furthermore, the mechanical connection of the abovementioned flanges:

- fluid dynamically connects the outlet port 251 to the inlet port 210 of the turbine 205;
- hydraulically connects the terminal ports 234C and 239A and the terminal ports 234D and 240A, hydraulically connecting, in such manner, the jacket 234 to the jackets 239, 240 and to the cooling circuit of the motor unit 201 of the internal combustion engine 200;
- hydraulically connects the terminal ports 224C and 249 and the terminal ports 235A and 250, hydraulically connecting, in such manner, the lubrication channel 224A and the collection channel 235 to the lubrication circuit of the motor unit 201 of the internal combustion engine.

The sleeve 43 is also mounted on the compressor body 213, in correspondence of the inlet port 216, in a manner entirely identical to that described regarding compressors 6, 106 (FIGS. 12-14 and 16-17).

Regarding the operation of the engine 200, the methods through which the two impellers are brought in rotation by means of the exhaust gases are substantially identical with respect to what has been described regarding the engine 1.

In order to prevent the melting of the stator assembly due to the high operating temperatures of the turbine 205, the cooling fluid circulating in the engine 200 passes from the first cooling jacket 239 to the jacket 234 through the ports 239A, 234C and traverses the jacket 234 lowering the temperature of the turbine body 208 (and of the central body 207). Then, the cooling fluid flows out, at a higher temperature, from the jacket 234 through the ports 234D, 240A, and flows into the second cooling jacket 240, from which the circulation within the head 203 proceeds.

Similarly, the lubricating fluid, particularly oil, conveyed under pressure to the terminal port 249, flows into the channel 224A through the port 224C, lubricates the rotor assembly 21 and it is collected in the collection channel 235 wherefrom, through the ports 235A, 250, it returns towards the cylinder block 2.

Also the engine 200 preserves the advantages described previously, and additionally requires less complexity regarding the casting of the various parts, given that the turbocharger assembly 204 is separated from the head 203.

However, the choice of the material of the turbine body 208 and of the central body 207 is wider, it is not bound to the use of the same material as the head 203, preferably an aluminium alloy. Actually, an aluminium alloy as well as gray cast iron may be used, hence avoiding expensive Nimonic® steels in any case.

Naturally, the details and embodiments may vary, even significantly, with respect to what has been described and illustrated purely by way of example, without departing from the scope of the present invention as defined by the attached.

The invention claimed is:

1. A supercharged internal combustion engine comprising:

a motor unit including a head and an exhaust manifold, a turbocharger assembly fluid dynamically connected to said exhaust manifold, wherein said turbocharger assembly includes a turbine, a central body and a compressor, wherein:

said turbocharger assembly comprises a lubrication channel for the passage of a lubricating fluid hydraulically connected to a lubrication circuit of said motor unit of said internal combustion engine, said turbine comprises a jacket, provided at least in part in a body thereof, arranged for the passage of a cooling fluid and in hydraulic communication with an inlet channel and an outlet channel hydraulically connected to a cooling circuit of said motor unit of said internal combustion engine, said inlet channel, outlet channel and lubrication channel being integrated in said turbocharger assembly in correspondence of a connection interface between said turbocharger assembly and said motor unit of said internal combustion engine said turbocharger assembly comprises a stator assembly including the body of said turbine, said central body and a body of said compressor, said central body comprises a cavity wherein a rotor assembly of said turbocharger assembly is housed, said rotor assembly comprises a first impeller rotatably mounted within the body of said turbine, a [healing] *bearing* pack, and a second impeller rotatably mounted in the body of said compressor, wherein said first and said second impellers are connected in rotation by means of a shaft, said exhaust manifold integrally cast in said turbocharge assembly, at least part of said stator assembly is integral with said head, said stator assembly comprises a first semi-shell integrally cast with said head and a second semi-shell separable from said first semi-shell, said connection interface between the turbocharger assembly and the motor unit being a surface which separates the first semi-shell from the head, the body of said turbine comprises a first and a second portion, said *body of said* compressor [comprises a body] including a first and a second portion, said central body comprises a first portion and a second portion, the first portion of the body of said turbine, the first portion of the body of said compressor and the first portion of the central body are integral with each other and define said first semi-shell, the second portion of the body of said turbine, the second portion of the body of said compressor and the second portion of said central body are integral with each other and define said second semi-shell, said jacket and said lubrication channel are provided in part in said first semi-shell and in part in said second semi-shell, wherein each portion of the jacket is hydraulically connected to a respective portion provided on the other semi-shell when the first and the second semi-shells are joined together, said bearing pack comprises a sleeve including annular grooves in hydraulic communication, by means of radial channels with an internal cavity provided in said sleeve, wherein said shaft is inserted in said internal cavity rotatably supported by a bushing, and wherein said rotor assembly is arranged for the insertion in axial direction into said turbocharger assembly.

[2. The internal combustion engine according to claim 1, wherein:

said stator assembly comprises a first semi-shell integral with said head and a second semi-shell separable from said first semi-shell, the body of said turbine comprises a first and a second portion, said compressor comprises a body including a first and a second portion, said central body comprises a first and a second portion, the first portion of the body of said turbine, the first portion of the body of said compressor and the first portion of the central body are integral with each other and define said first semi-shell, the second portion of the body of said turbine, the second portion of the body of said compressor and the second portion of said central body are integral with each other and define said second semi-shell, said jacket and said lubrication channel are provided in part in said first semi-shell and in part in said second semi-shell.]

3. [The internal combustion engine according to claim 1,] *A supercharged internal combustion engine comprising:*

*a motor unit including a head and an exhaust manifold,*

*a turbocharger assembly fluid dynamically connected to said exhaust manifold, wherein said turbocharger assembly includes a turbine, a central body and a compressor,*

*wherein:*

*said turbocharger assembly comprises a lubrication channel for the passage of a lubricating fluid hydraulically connected to a lubrication circuit of said motor unit of said internal combustion engine,*

*said turbine comprises a jacket, provided at least in part in a body thereof, arranged for the passage of a cooling fluid and in hydraulic communication with an inlet channel and an outlet channel hydraulically connected to a cooling circuit of said motor unit of said internal combustion engine,*

*said inlet channel, outlet channel and lubrication channel being integrated in said turbocharger assembly in correspondence of a connection interface between said turbocharger assembly and said motor unit of said internal combustion engine*

*said turbocharger assembly comprises a stator assembly including the body of said turbine, said central body and a body of said compressor,*

*said central body comprises a cavity wherein a rotor assembly of said turbocharger assembly is housed,*

*said rotor assembly comprises a first impeller rotatably mounted within the body of said turbine, a bearing pack, and a second impeller rotatably mounted in the body of said compressor, wherein said first and said second impellers are connected in rotation by means of a shaft,*

*said exhaust manifold integrally cast in said turbocharger assembly,*

*at least part of said stator assembly is integral with said head,*

*said stator assembly comprises a first semi-shell integrally cast with said head and a second semi-shell separable from said first semi-shell, said connection interface between the turbocharger assembly and the motor unit being a surface which separates the first semi-shell from the head,*

*the body of said turbine comprises a first and a second portion, said compressor comprises a body including a first and a second portion, said central body comprises a first portion and a second portion,*

*the first portion of the body of said turbine, the first portion of the body of said compressor and the first portion of the central body are integral with each other and define said first semi-shell,*

*the second portion of the body of said turbine, the second portion of the body of said compressor and the second portion of said central body are integral with each other and define said second semi-shell,*

*said jacket and said lubrication channel are provided in part in said first semi-shell and in part in said second semi-shell, wherein each portion of the jacket is hydraulically connected to a respective portion provided on the other semi-shell when the first and the second semi-shells are joined together,*

*said bearing pack comprises a sleeve including annular grooves in hydraulic communication, by means of radial channels with an internal cavity provided in said sleeve, wherein said shaft is inserted in said internal cavity rotatably supported by a bushing,*

*wherein said rotor assembly is arranged for the insertion in axial direction into said turbocharger assembly, and* wherein the entire stator assembly of said turbocharger assembly is integral with said head.

4. The internal combustion engine according to claim 1, wherein said compressor comprises an inlet port in correspondence of which there is mounted a sleeve having an internal channel and a fastening flange rigidly connected to a body of said compressor.

*5. A method for manufacturing an internal combustion engine, the method comprising:*

*providing a motor unit including a head and an exhaust manifold,*

*fluid dynamically connecting the exhaust manifold to a turbocharger assembly, the exhaust manifold integrally cast in the turbocharger assembly, and the turbocharger assembly including a turbine, a central body and a compressor,*

*a lubrication channel of the turbocharger assembly allowing passage of a lubricating fluid hydraulically connected to a lubrication circuit of the motor unit of the internal combustion engine,*

*the turbine comprising a jacket at least in part in a body of the turbine, the jacket arranged for the passage of a cooling fluid and in hydraulic communication with an inlet channel and an outlet channel hydraulically connected to a cooling circuit of the motor unit of the internal combustion engine,*

*the inlet channel, outlet channel and lubrication channel being integrated in said turbocharger assembly in correspondence of a connection interface between the turbocharger assembly and the motor unit of the internal combustion engine,*

*a stator assembly of the turbocharger assembly including the body of the turbine, the central body and a body of the compressor,*

*joining a first semi-shell of the stator assembly to a second semi-shell of the stator assembly, the second semi-shell separable from the first semi-shell, and the first semi-shell integrally cast with said head, wherein the connection interface between the turbocharger assembly and the motor unit being a surface which separates the first semi-shell from the head,*

*machining a central cavity of the body of the compressor to obtain a combination of surface finishing and geometric tolerances required for insertion of the rotor assembly into the central cavity,*

*said rotor assembly comprising a first impeller rotatably mounted within the body of said turbine, and a second impeller rotatably mounted in the body of said compressor, said first and said second impellers connected in rotation by means of a shaft,*

*inserting the rotor assembly into the cavity along a rotation axis of the first and second impeller, the rotor assembly being pre-mounted upon insertion,*

*securing the rotor assembly into position; and*

*wherein the body of said turbine comprises a first and a second portion, the body of the compressor comprises includes a first and a second portion, said central body comprises a first portion and a second portion,*

*the first portion of the body of said turbine, the first portion of the body of the compressor and the first portion of the central body are integral with each other and define the first semi-shell, and*

*the second portion of the body of the turbine, the second portion of the body of the compressor and the second portion of the central body are integral with each other and define the second semi-shell.*

*6. The method of claim 5 wherein the jacket and the lubrication channel are provided in part in the first semi-shell and in part in the second semi-shell, wherein each portion of the jacket is hydraulically connected to a respective portion provided on the other semi-shell when the first and the second semi-shells are joined together.*

*7. The method of claim 6 wherein the stator comprises a bearing pack, the bearing pack comprises a sleeve including annular grooves in hydraulic communication, by means of radial channels with an internal cavity provided in the sleeve, wherein the shaft is inserted in the internal cavity rotatably supported by a bushing.*

*8. The method of claim 5 wherein the joining comprises temporarily joining the first semi shell and the second semi shell, and further comprising temporarily separating the first semi shell and the second semi shell to allow removing a chip resulting from the machining prior to inserting the rotor assembly into the cavity of the central body, and subsequently fastening the first and second semi shells together.*

*9. The method of claim 5 wherein the securing the rotor assembly into position comprises axially blocking the rotor assembly inside the cavity by inserting a pin or a threaded dowel into a first hole in the central body and a second hole in a bearing pack of the stator.*

*10. A method for manufacturing an internal combustion engine, the method comprising:*

*providing a motor unit including a head and an exhaust manifold,*

*fluid dynamically connecting the exhaust manifold to a turbocharger assembly, the exhaust manifold integrally cast in the turbocharger assembly, and the turbocharger assembly including a turbine, a central body and a compressor,*

*a lubrication channel of the turbocharger assembly allowing passage of a lubricating fluid hydraulically connected to a lubrication circuit of the motor unit of the internal combustion engine,*

*the turbine comprising a jacket at least in part in a body of the turbine, the jacket arranged for the passage of a cooling fluid and in hydraulic communication with an inlet channel and an outlet channel hydraulically connected to a cooling circuit of the motor unit of the internal combustion engine,*

*the inlet channel, outlet channel and lubrication channel being integrated in said turbocharger assembly in correspondence of a connection interface between the turbocharger assembly and the motor unit of the internal combustion engine,*

*a stator assembly of the turbocharger assembly including the body of the turbine, the central body and a body of the compressor,*

*joining a first semi-shell of the stator assembly to a second semi-shell of the stator assembly, the second semi-shell separable from the first semi-shell, and the first semi-shell integrally cast with said head, wherein the connection interface between the turbocharger assembly and the motor unit being a surface which separates the first semi-shell from the head,*

*machining a central cavity of the central body of the compressor to obtain a combination of surface finishing and geometric tolerances required for insertion of the rotor assembly into the central cavity,*

*the rotor assembly comprising a first impeller rotatably mounted within the body of said turbine, a bearing pack, and a second impeller rotatably mounted in the body of said compressor, said first and said second impellers connected in rotation by means of a shaft,*

*inserting the rotor assembly into the cavity along a rotation axis of the first and second impeller, the rotor assembly being pre-mounted upon insertion,*

*securing the rotor assembly into position;*

*wherein the body of said turbine comprises a first and a second portion, the body of the compressor comprises includes a first and a second portion, said central body comprises a first portion and a second portion,*

*the first portion of the body of said turbine, the first portion of the body of the compressor and the first portion of the central body are integral with each other and define the first semi-shell, and*

*the second portion of the body of the turbine, the second portion of the body of the compressor and the second portion of the central body are integral with each other and define the second semi-shell, and*

*the entire stator assembly of the turbocharger assembly is formed integral with the head.*

*11. The method of claim 10 further comprising removing a chip resulting from the machining prior to inserting the rotor assembly into the cavity of the central body.*

*12. The method of claim 10 wherein securing the rotor assembly into position comprises axially blocking the rotor assembly inside the cavity by inserting a pin or a threaded dowel into a first hole in the central body and a second hole in a bearing pack of the rotor assembly.*

*13. The method of claim 10 wherein the jacket and the lubrication channel are provided in part in the first semi-shell and in part in the second semi-shell, wherein each portion of the jacket is hydraulically connected to a respective portion provided on the other semi-shell when the first and the second semi-shells are joined together.*

*14. The method of claim 13 wherein the stator comprises a bearing pack, the bearing pack comprises a sleeve including annular grooves in hydraulic communication, by means of radial channels with an internal cavity provided in the sleeve, wherein the shaft is inserted in the internal cavity rotatably supported by a bushing.*

* * * * *